(12) United States Patent
Zhang et al.

(10) Patent No.: US 10,805,947 B2
(45) Date of Patent: Oct. 13, 2020

(54) METHOD FOR UPLINK PACKET SCHEDULING AND DEVICE THEREOF

(71) Applicant: Samsung Electronics Co., Ltd., Suwon-si, Gyeonggi-do (KR)

(72) Inventors: Shichang Zhang, Beijing (CN); Yingyang Li, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 500 days.

(21) Appl. No.: 14/429,932

(22) PCT Filed: Nov. 20, 2013

(86) PCT No.: PCT/KR2013/010574
§ 371 (c)(1),
(2) Date: Mar. 20, 2015

(87) PCT Pub. No.: WO2014/081197
PCT Pub. Date: May 30, 2014

(65) Prior Publication Data
US 2015/0237649 A1 Aug. 20, 2015

(30) Foreign Application Priority Data

Nov. 20, 2012 (CN) .......................... 2012 1 0473314

(51) Int. Cl.
*H04W 4/70* (2018.01)
*H04W 72/04* (2009.01)
(Continued)

(52) U.S. Cl.
CPC ......... *H04W 72/1284* (2013.01); *H04W 4/70* (2018.02); *H04W 72/0446* (2013.01);
(Continued)

(58) Field of Classification Search
CPC ............. H04W 4/005; H04W 72/0446; H04W 72/121; H04W 72/1284; H04W 88/08
(Continued)

(56) References Cited

U.S. PATENT DOCUMENTS

2003/0228865 A1 12/2003 Terry
2005/0220116 A1 10/2005 Ahn et al.
(Continued)

FOREIGN PATENT DOCUMENTS

CN 101715237 A 5/2010
CN 101841401 A 9/2010
(Continued)

*Primary Examiner* — Huy D Vu
*Assistant Examiner* — Nizam U Ahmed
(74) *Attorney, Agent, or Firm* — Jefferson IP Law, LLP

(57) ABSTRACT

The present invention provides a method for uplink packet scheduling, comprising the following steps: a base station determines types of terminals, and groups the terminals based on types thereof; the base station transmits pre-scheduling indication information and uplink scheduling commands to the terminals in a group with a same type; the base station receives Physical Uplink Shared Channel (PUSCH) transmitted by the terminals on a corresponding uplink sub-frame. The present invention further provides a base station and a terminal. In the above solution provided by this invention, eNB sorts accessed MTC terminals into different types of groups based on types thereof via a high-layer signaling, part of the MTC terminals in a type group are sorted into a scheduling group via a pre-scheduling instruction carried by PDSCH, all the MTC terminals in that group are scheduled via an uplink scheduling command. The solution provided by this invention can obviously reduce the number of times that the base station transmits uplink scheduling commands, and alleviate the burden on the base station of scheduling PUSCH transmission of MTC terminals.

11 Claims, 9 Drawing Sheets

(51) Int. Cl.
    *H04W 72/12*     (2009.01)
    *H04W 88/08*     (2009.01)

(52) U.S. Cl.
    CPC ...... *H04W 72/121* (2013.01); *H04W 72/1268* (2013.01); *H04W 88/08* (2013.01)

(58) Field of Classification Search
    USPC .......................................................... 370/329
    See application file for complete search history.

(56) References Cited

U.S. PATENT DOCUMENTS

| | | |
|---|---|---|
| 2009/0168704 A1 | 7/2009 | Lee et al. |
| 2009/0312024 A1* | 12/2009 | Chen ................... H04W 36/04 455/437 |
| 2010/0172314 A1* | 7/2010 | Lim ...................... H04L 1/0025 370/329 |
| 2011/0149897 A1 | 6/2011 | Youn et al. |
| 2012/0026962 A1* | 2/2012 | Inoue ................. H04L 27/2613 370/329 |
| 2012/0033613 A1* | 2/2012 | Lin ..................... H04W 74/085 370/328 |
| 2012/0064932 A1* | 3/2012 | Lim ...................... H04W 4/005 455/509 |
| 2013/0051265 A1* | 2/2013 | Barbieri ............ H04W 72/1273 370/252 |
| 2013/0083753 A1* | 4/2013 | Lee ................... H04W 72/0453 370/329 |
| 2013/0150109 A1* | 6/2013 | Takano ................... H04W 4/70 455/509 |
| 2013/0195041 A1* | 8/2013 | Papasakellariou .. H04W 72/042 370/329 |
| 2013/0242730 A1* | 9/2013 | Pelletier ............ H04W 28/0284 370/230 |
| 2013/0311640 A1* | 11/2013 | Gleixner ............. H04W 40/246 709/224 |
| 2015/0139153 A1* | 5/2015 | Zhang ................. H04W 68/005 370/329 |

FOREIGN PATENT DOCUMENTS

| | | | | |
|---|---|---|---|---|
| CN | 102413576 A | | 4/2012 | |
| CN | 102487548 A | | 6/2012 | |
| JP | 2012080416 A | * | 4/2012 | ............ H04L 5/001 |
| WO | 2008/156264 A1 | | 12/2008 | |
| WO | WO-2012046506 A1 | * | 4/2012 | ............ H04L 5/001 |

* cited by examiner

[Fig. 1]

```
S110: a base station determines types of terminals, and groups
the terminals based on types thereof
            ↓
S120: the base station transmits pre-scheduling indication
information and uplink scheduling commands to the terminals in
a group with a same type
            ↓
S130: the base station receives PUSCH transmitted
by the terminal on a corresponding uplink sub-frame
```

[Fig. 2]

```
S210: a terminal receives RNTI of a type group as well as IDs of
members in the type group transmitted by a base station, and
monitors PDCCH transmitted by the base station based on the RNTI
            ↓
S220: the terminal obtains pre-scheduling indication information
according to PDSCH indicated by PDCCH
            ↓
S230: the terminal transmits PUSCH on a corresponding
uplink sub-frame
```

[Fig. 3]
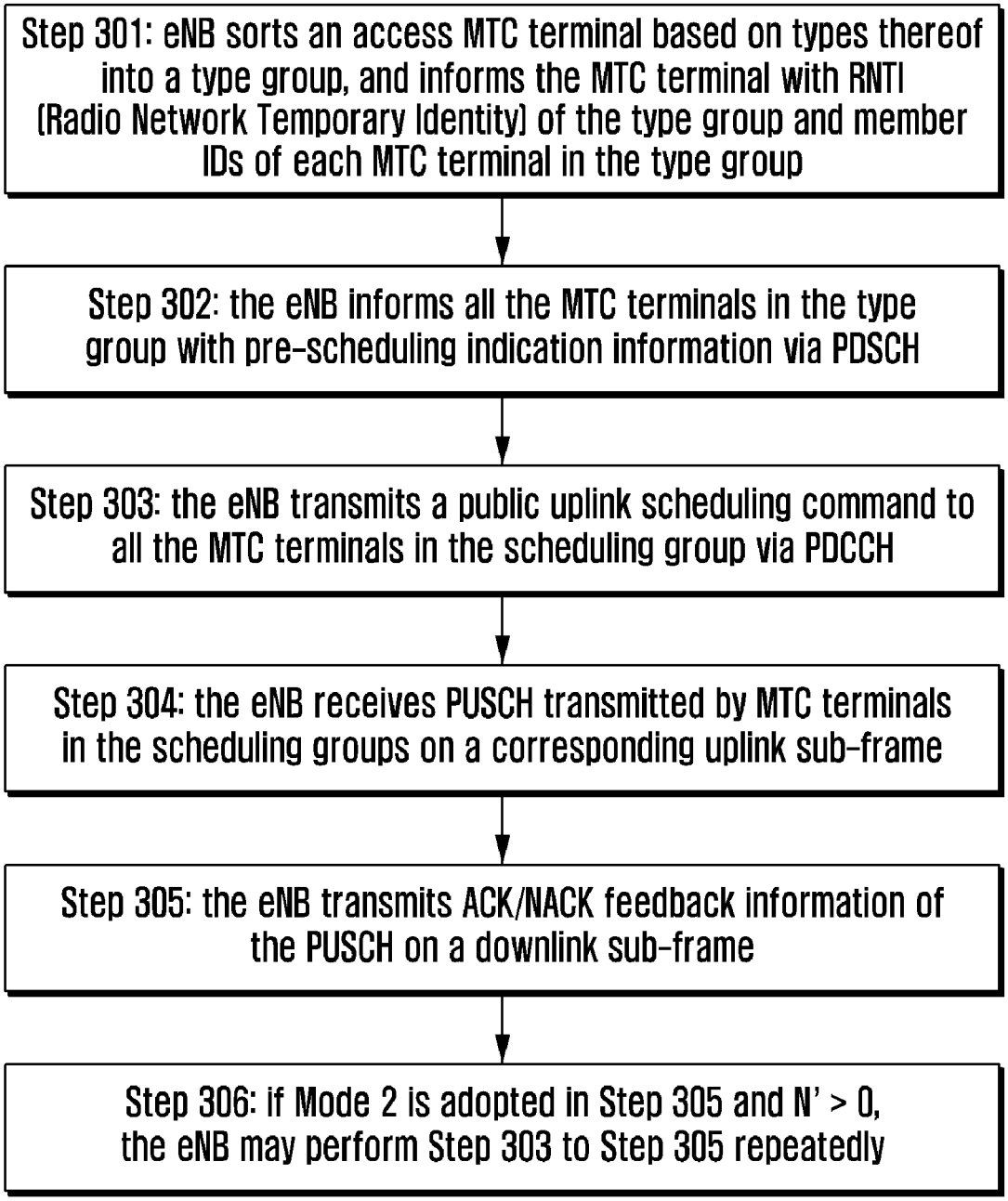

[Fig. 4]
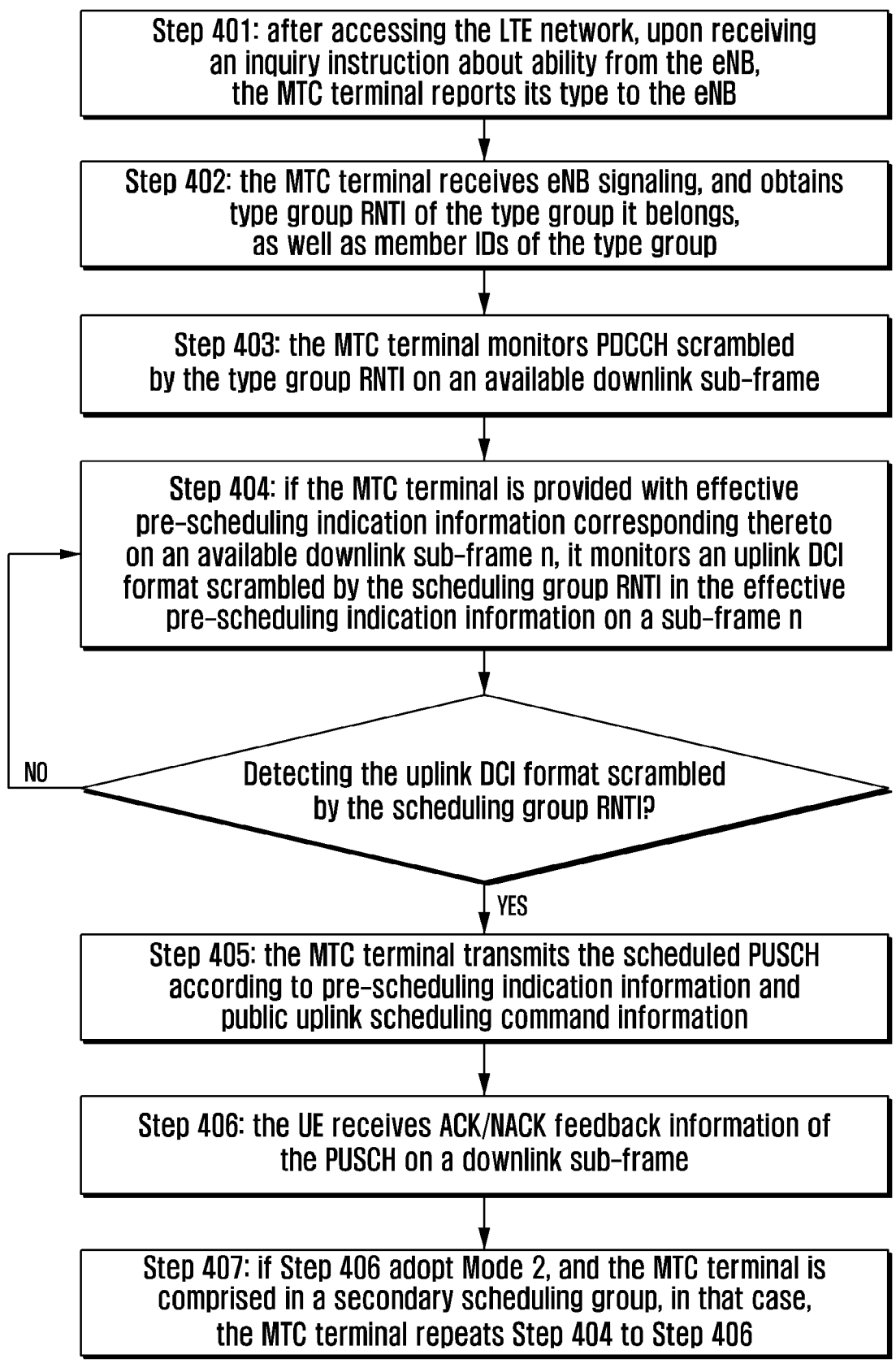

[Fig. 5]
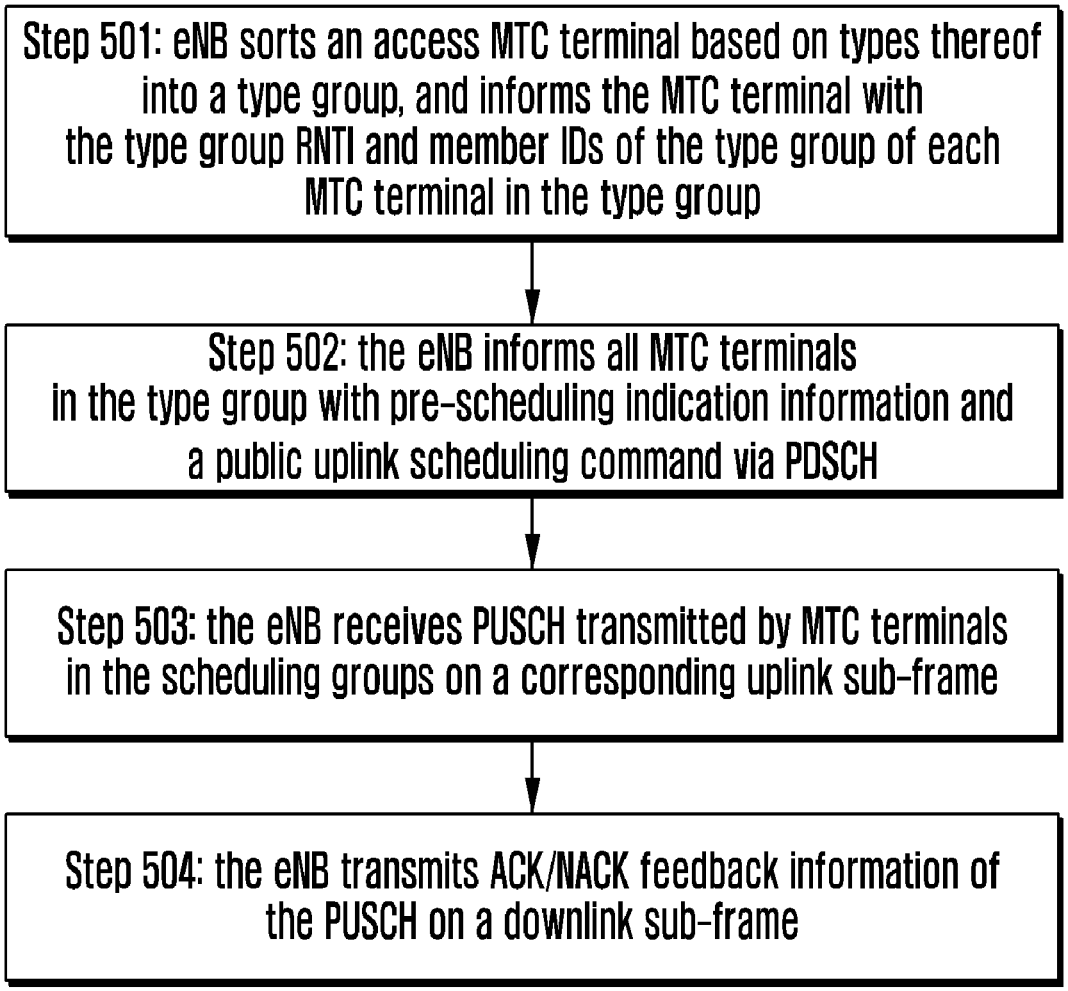

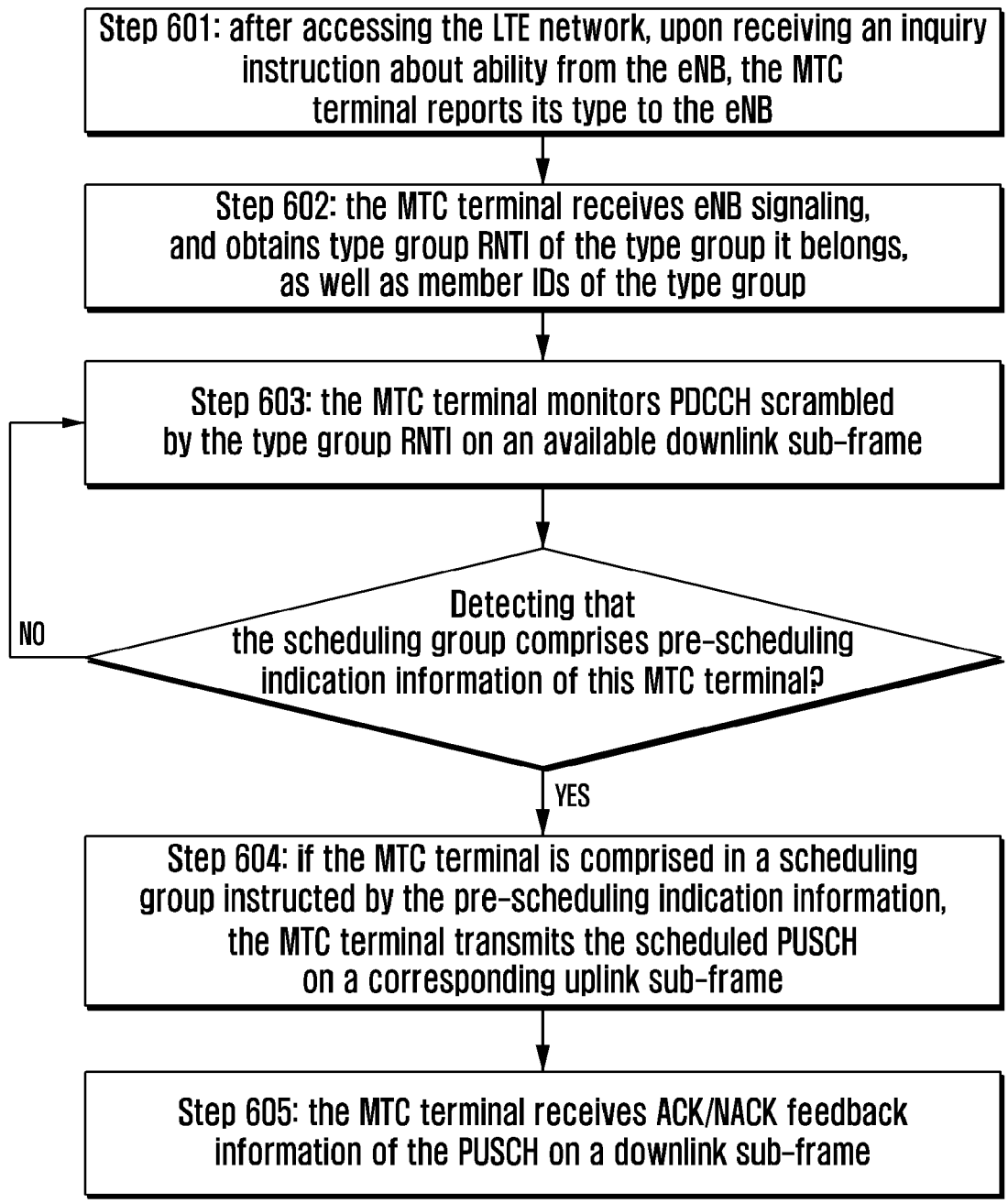
[Fig. 6]

[Fig. 7]
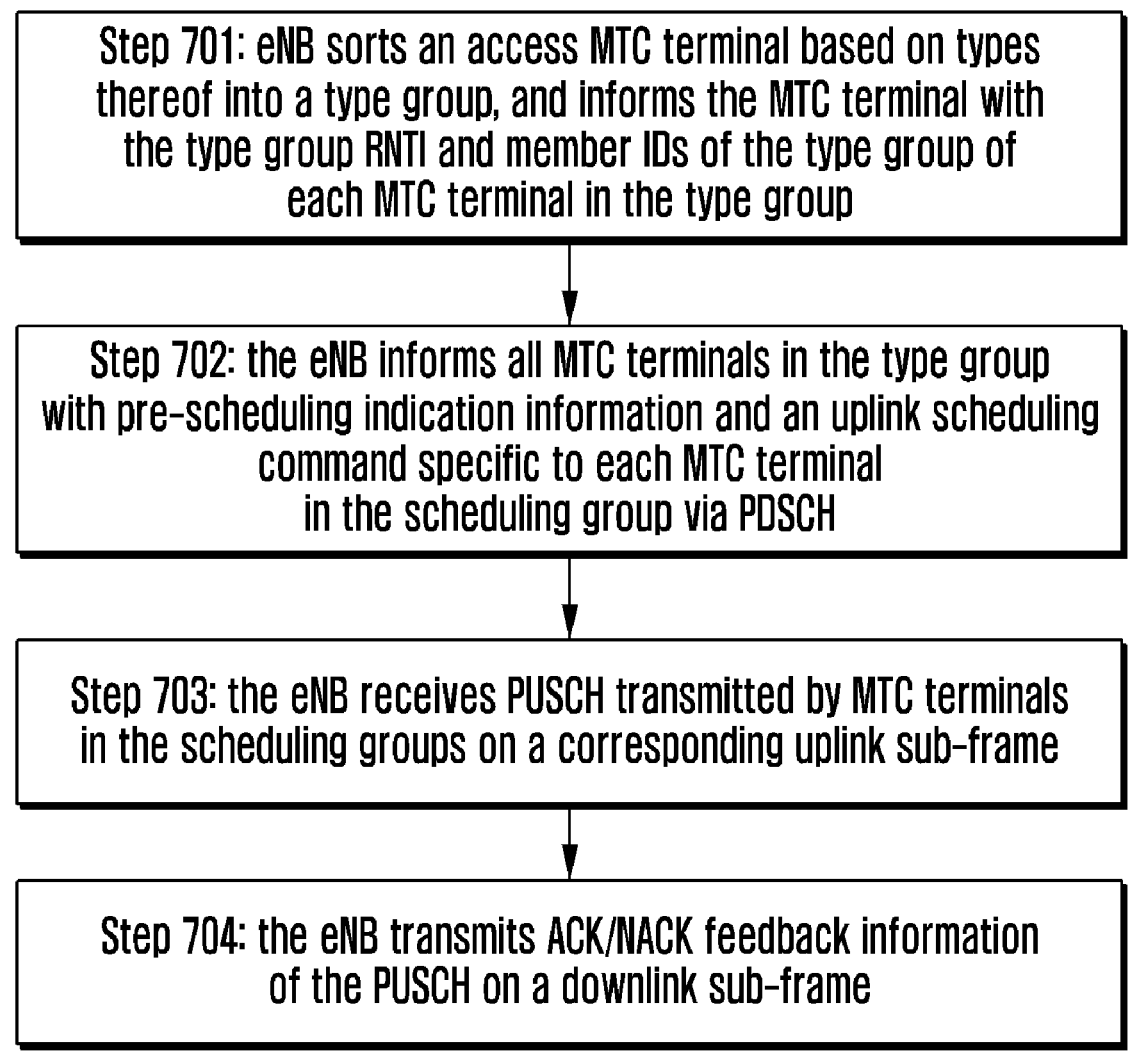

[Fig. 8]
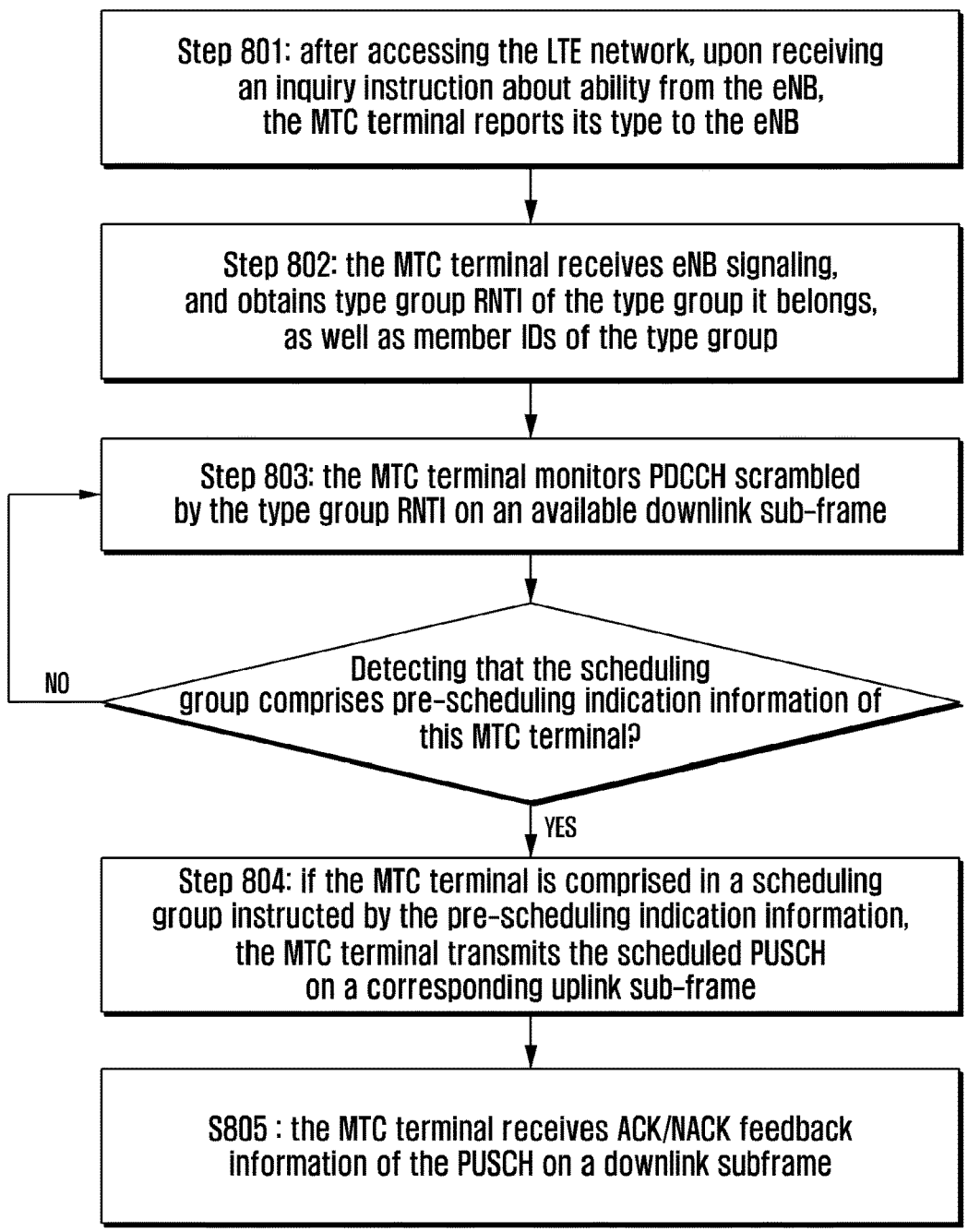
[Fig. 9]
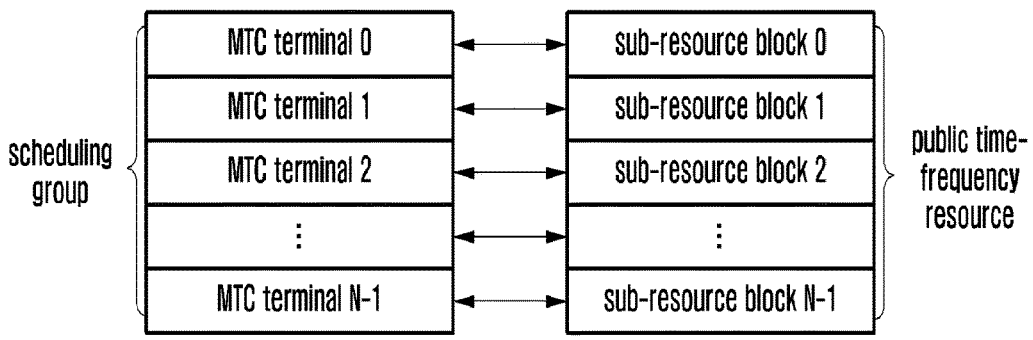

[Fig. 10]
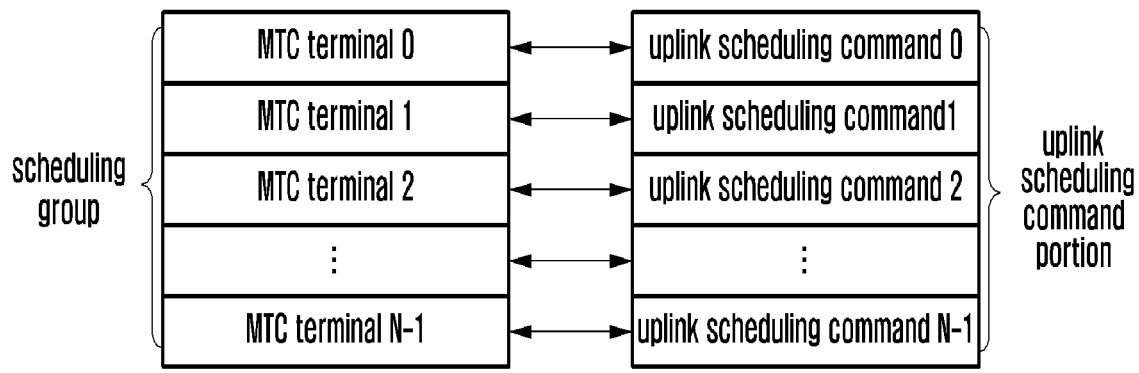
[Fig. 11]
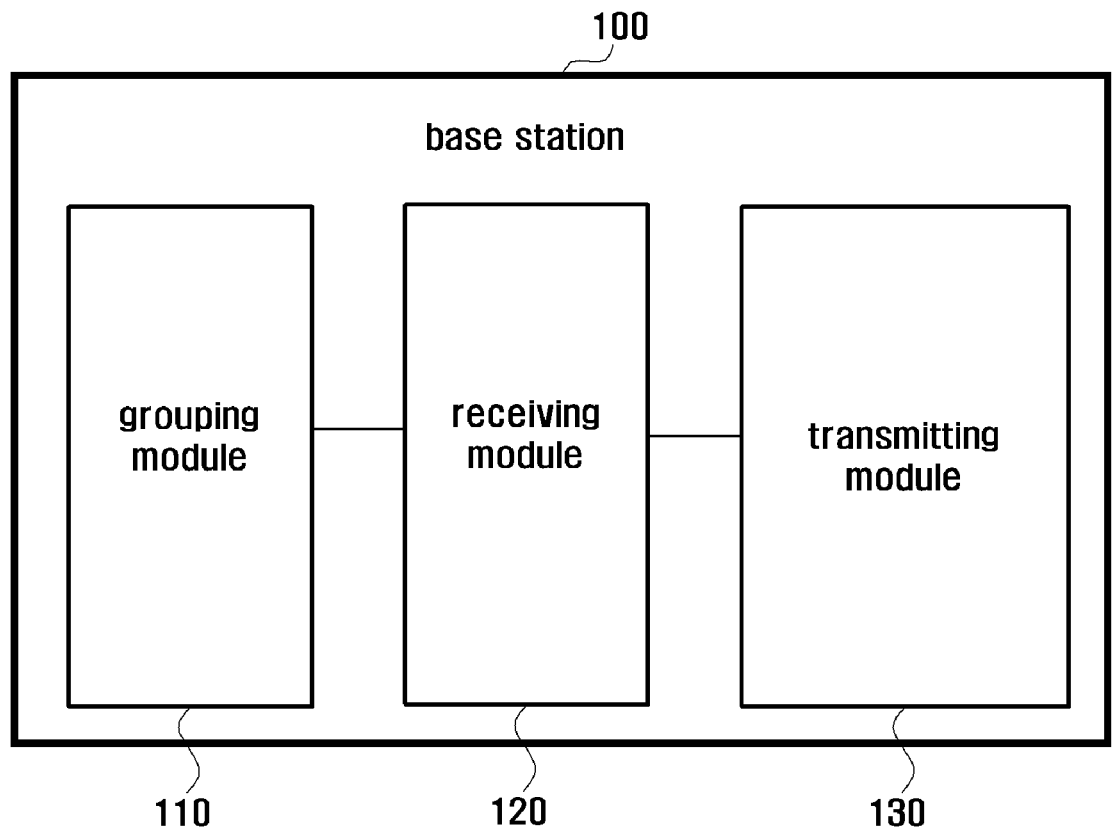

[Fig. 12]
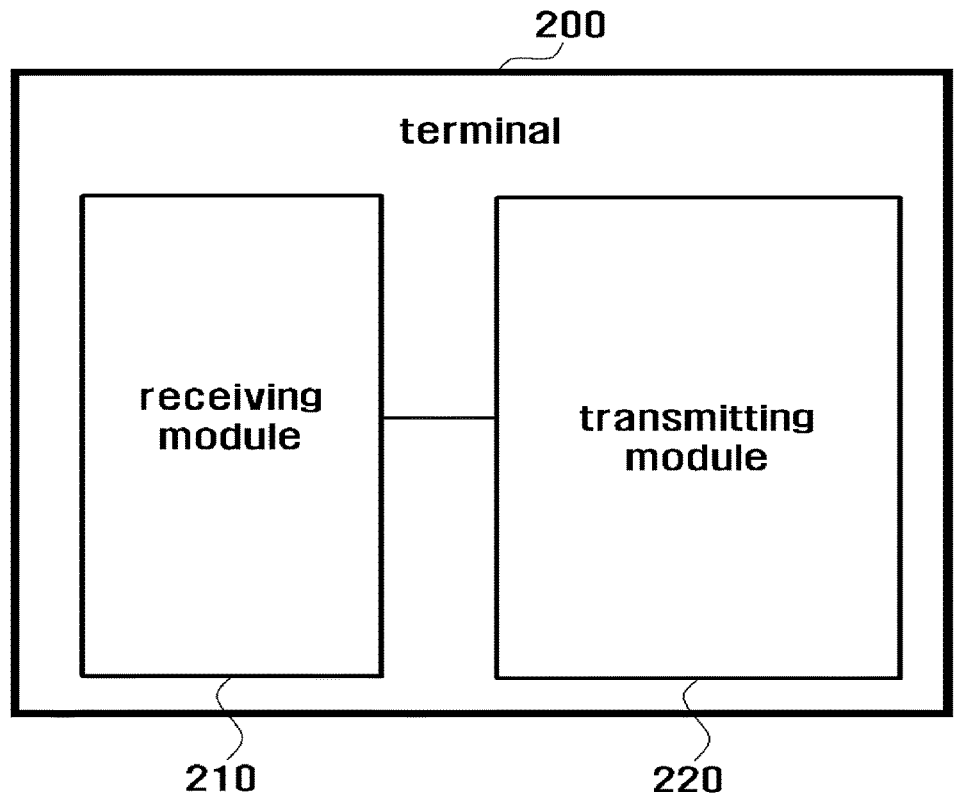
[Fig. 13]
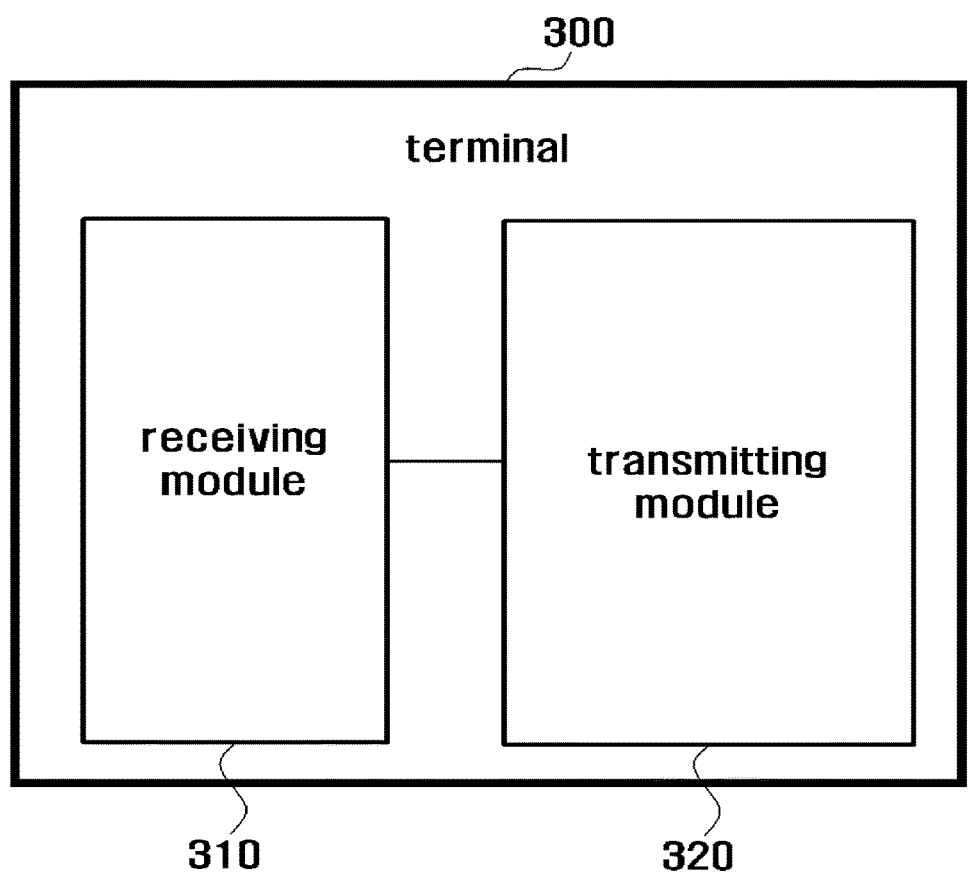

METHOD FOR UPLINK PACKET SCHEDULING AND DEVICE THEREOF

TECHNICAL FIELD

This invention relates to the technical field of mobile communications, to be specific, this invention relates to methods and devices for uplink packet scheduling.

BACKGROUND ART

In the current LTE (Long Term Evolution) technology, PUSCH (Physical Uplink Shared Channel) transmission of terminals is controlled by an uplink scheduling command of eNB (evolved Node B). In the 3GPP (3rd Generation Partnership Project) protocols, such an uplink scheduling command is called as UL Grant (namely, uplink grant), which is carried by PDCCH (Physical Downlink Control Channel) format 0 or format 4 (except for random access UL Grant in a feedback, similarly hereinafter). The UL Grant may instruct a terminal with necessary information for PUSCH transmission, such as time-frequency position of the scheduled PUSCH, MCS (Modulation and Coding Scheme), new transmitted instructions, etc. As instructed by the received UL Grant, the terminal transmits PUSCH on a corresponding uplink sub-frame based on a time-position corresponding relation between the UL grant and the PUSCH in the current system, according to the instruction in the UL Grant.

Herein, the time-position corresponding relation between UL Grant and PUSCH depends upon configuration of the current system. In case of a FDD (Frequency Division Duplex) system, the time interval between the PUSCH and UL Grant is fixed at 4 ms; in case of a TDD (Time Division Duplex) system, the time interval between PUSCH and UL Grant depends upon uplink/downlink configuration of the current TDD system. At present, there are seven different TDD uplink/downlink configurations that are defined in the 3GPP protocols, i.e. configurations from #0 to #6. As for different configurations, time intervals between UL Grant and PUSCH are shown in Table 1, wherein a cell position located by a value denote a position of a UL Grant, and the value represents a time interval between the UL Grant and the PUSCH.

TABLE 1

Time-position corresponding relation between UL Grant and PUSCH

| Configuration Number | Downlink Sub-frame Index n | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 6, 7 | | | | 4, 7 | 6, 7 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | | 7 | 7 | | | 7 | 7 | | | 5 |

It deserves an additional explanation that PDCCH that carries UL Grant is scrambled by a specific C-RNTI (Cell-Radio Network Temporary Identity), and a C-RNTI is the only identity in a cell assigned by eNB to UE, which means that only PUSCH transmission of one terminal is scheduled once when the eNB transmits UL Grant.

DISCLOSURE OF INVENTION

Technical Problem

However, in LTE network that supports MTC (Machine-Type Communications) terminals, contrary to the vast number of MTC terminals in a cell, the number of PDCCH resources is quite limited, if the current manner of scheduling terminals continues one by one, it severely increases burden of PDCCH, and causes congestion of PDCCH. In the evolution process of the following LTE system, ePDCCH (evolved Physical Downlink Control Channel) may be introduced so as to increase capacity of the PDCCH to some extent. However, scheduling such a huge number of MTC terminals via ePDCCH also increases the number of time-frequency resources occupied by ePDCCH.

Hence, as for the LTE network that supports MTC, when a large number of MTC terminals simultaneously request for uplink services, employment of the current uplink scheduling manner easily causes congestion of PDCCH, and thus reduces performances of the entire system and user experience.

Solution to Problem

An object of this invention is to at least overcome any of the above technical defects, in particular, in order to lessen the burden on scheduling PUSCH of MTC terminals by eNB in the LTE network that supports MTC, and relieve PDCCH or ePDCCH congestion, the present invention provides a solution of scheduling PUSCH transmission of MTC terminals in batches after classifying the terminals.

In one aspect, this invention provides a method for uplink packet scheduling, comprising the following steps:

a base station determines types of terminals, and groups the terminals based on types thereof;

the base station transmits pre-scheduling indication information and uplink scheduling commands to the terminals in a group with a same type;

the base station receives PUSCH (Physical Uplink Shared Channel) transmitted by the terminals on a corresponding uplink sub-frame.

In another aspect, this invention further provides a method for uplink packet scheduling, comprising the following steps:

a terminal receives RNTI (Radio Network Temporary Identity) of a type group and IDs of members in the type group transmitted by a base station, and monitors PDCCH transmitted by the base station based on the RNTI;

the terminal obtains pre-scheduling indication information according to the PDSCH (Physical Downlink Shared Channel) indicated by the PDCCH, the terminal further obtains an uplink scheduling instruction by monitoring PDCCH on a downlink sub-frame based on the pre-scheduling indication information;

the terminal transmits a PUSCH (Physical Uplink Shared Channel) on a corresponding uplink sub-frame.

In another aspect, this invention further provides a method for uplink packet scheduling, comprising the following steps:

a terminal receives RNTI of a type group and IDs of members in the type group transmitted by a base station, and monitors PDCCH transmitted by the base station based on the RNTI;

the terminal obtains pre-scheduling indication information and an uplink scheduling command according to a PDSCH indicated by the PDCCH;

the terminal transmits the PDSCH (Physical Downlink Shared Channel) on a corresponding uplink sub-frame.

In another aspect, examples of this invention further provides a base station comprising a grouping module, a receiving module and a transmitting module, the grouping module being used for determining type of terminals, and grouping the terminals based on types thereof;

the transmitting module being used for transmitting pre-scheduling indication information and uplink scheduling commands to the terminals in a group with a same type;

the receiving module being used for receiving a PUSCH (Physical Uplink Shared Channel) transmitted by the terminals on a corresponding uplink sub-frame.

In another aspect, examples of this invention further provides a terminal comprising a receiving module and a transmitting module, the receiving module being used for receiving RNTI of a type group and IDs of members in the type group transmitted by a base station, and monitoring PDCCH transmitted by the base station based on the RNTI, and for receiving pre-scheduling indication information according to PDSCH indicated by the PDCCH, and further obtaining an uplink scheduling instruction by receiving PDCCH based on pre-scheduling indication information;

the transmitting module being used for transmitting a PUSCH (Physical Uplink Shared Channel) on a corresponding uplink sub-frame.

In another aspect, examples of this invention further provides a terminal comprising a receiving module and a transmitting module, the receiving module being used for receiving RNTI of a type group and IDs of members in the type group transmitted by a base station, and monitoring PDCCH transmitted by the base station based on the RNTI, and for receiving pre-scheduling indication information and an uplink scheduling command according to PDSCH indicated by the PDCCH;

the transmitting module being used for transmitting a PUSCH on a corresponding uplink sub-frame.

The above solution provided by this invention schedules terminal PUSCH transmissions in batches after classifying the terminals. In the above solution provided by this invention, eNB sorts accessed MTC terminals into different types of groups based on types thereof via a high-layer signaling, part of the MTC terminals in a type group are assigned to a scheduling group via a pre-scheduling instruction carried by PDSCH, all the MTC terminals in that group are scheduled via an uplink scheduling command; the MTC terminals determine the type group and the scheduling group thereof by receiving a high-layer signaling and a pre-scheduling instruction carried by PDSCH, followed by receiving an uplink scheduling command, and transmitting the scheduled PUSCH according to the uplink scheduling command and the pre-scheduling instruction. The solution provided by this invention can obviously reduce the number of times for a base station to transmit uplink scheduling commands, and alleviate the burden on the base station of scheduling PUSCH transmission of MTC terminals. Moreover, the solution provided by this invention is simple to be carried out and high efficient, which barely changes the prior system, and exerts no influence on the system compatibility.

The additional aspects and advantages of the present invention will be partially shown in the description as follows, and they will become apparent in the following description, or can be learned through practices of the present invention.

BRIEF DESCRIPTION OF DRAWINGS

The foregoing and/or further aspects and advantages of the invention will become apparent from and will be understood from the following descriptions of embodiments with reference to drawings. In the drawings:

FIG. 1 is a flow chart of the method for network side uplink packet scheduling in the examples of this invention;

FIG. 2 is a flow chart of the method for terminal side uplink packet scheduling in the examples of this invention;

FIG. 3 is a flow chart of the base station side method of Application Scenario 1;

FIG. 4 is a flow chart of the terminal side method of Application Scenario 1;

FIG. 5 is a flow chart of the base station side method of Application Scenario 2;

FIG. 6 is a flow chart of the terminal side method of Application Scenario 2;

FIG. 7 is a flow chart of the base station side method of Application Scenario 3;

FIG. 8 is a flow chart of the terminal side method of Application Scenario 3;

FIG. 9 is a schematic diagram of resource allocation;

FIG. 10 is a schematic diagram of scheduling command matching;

FIG. 11 is a structural diagram of the base station device in the examples of this invention;

FIG. 12 is a structural diagram of terminal 1 in the examples of this invention;

FIG. 13 is a structural diagram of terminal 2 in the examples of this invention;

MODE FOR THE INVENTION

The embodiments of the invention will be further described in details as below. Examples of the embodiments are as shown in drawings, in which same or similar reference numbers always represent same or similar elements or elements with same or similar functions. The embodiments described with reference to the drawings are exemplary, just used for explaining the invention, not for limiting the invention.

An ordinary person skilled in the art may understand that "a", "an", "said" and "this" may also refer to plural nouns, unless otherwise specifically stated. It should be further understood that, phraseology "include" used in the specification of the invention refers to the presence of the characteristics, integers, steps, operations, elements and/or components, but not exclusive of the presence or addition of one or more other characters, integers, steps, operations, elements, components and/or groups thereof. It should be understood that when we mention that an element is "connected" or "coupled" to another element, it may be directly connected or coupled to the other elements, or intermediate elements may be available. In addition, "connection" or "coupling" used herein may include wireless connection or coupling. The phraseology "and/or" includes any one unit and all combinations of one or more associated listed items.

An ordinary person skilled in the art may understand that, unless otherwise defined, all terms (including technical terms and scientific terms) used herein have the same meaning as commonly understood by an ordinary person skilled in the art to which this invention belongs. It should also be understood that terms such as those defined in commonly used dictionaries should be interpreted as having a meaning that is consistent with their meaning in the context of the prior art, and will not be interpreted in an idealized or overly formal sense unless expressly so defined herein.

An ordinary person skilled in the art may understand that "terminal" and "terminal equipment" used herein include not only equipment having a radio signal receiver without transmitting function, but also equipment having receiving and transmitting hardware capable of realizing bidirectional communication on bidirectional communication links. Such equipment may include: cellular or other communication equipment with or without a multi-line display; Personal Communication Systems (PCS) that may combine voice and data processing, faxing and/or data communication together; Personal Digital Assistants (PDA) that may include a radio frequency receiver and a pager, internet/intranet access, a web browser, a notepad, calendar and/or a Global Positioning System (GPS) receiver; and/or conventional laptop computer and/or palmtop computer including a radio frequency receiver or other equipment. Terms "terminal" and "terminal equipment" used herein may be portable, transportable and installed in vehicles (for aviation, sea transportation and/or land use), or may be suitable for and/or configured to operate locally and/or to operate in any other locations by distributing in the earth and/or space. Terms "terminal" and "terminal equipment" used herein may also be a communication terminal, an internet terminal and an audio/video player terminal, for example, a PDA, an MID and/or a mobile phone with a music/video playback function. It may be equipment such as a smart TV and a set-top box. Terms "base station" and "base station equipment" are network-side equipment corresponding to "terminal" and "terminal equipment".

The solution provided by this invention is directed to the LTE network that supports MTC. In a scenario like this, it frequently occurs that a large number of MTC terminals request for uplink transmission simultaneously. Based on the solution provided by this invention, eNB (namely, a base station) sorts a portion of MTC terminals into a group via a pre-scheduling instruction, and then schedules all the MTC terminals in that group via an uplink scheduling command. The uplink scheduling command carries information such as MCS and time-frequency resource necessary for PUSCH transmission of MTC terminals in the group. In particular, the pre-scheduling instruction and the uplink scheduling command can be jointly encoded and transmitted in a same sub-frame. However, the technical solution provided by this invention is not limited to be applied to MTC terminals, but also to other terminal devices similar to MTC terminals. The technical solution may be employed in case of a requirement for packet scheduling. Technical solutions presented by this invention are respectively illustrated hereinafter.

To attain the purpose of this invention, in one aspect, this invention provides a method for uplink packet scheduling, comprising the following steps:

a base station determines types of terminals, and groups the terminals based on types thereof;

the base station transmits pre-scheduling indication information and uplink scheduling commands to the terminals in a group with a same type;

the base station receives PUSCH transmitted by the terminals on a corresponding uplink sub-frame.

FIG. 1 shows a flow chart of the method for network side uplink packet scheduling in the examples of this invention, comprising Steps S110 to S130:

S110: a base station determines types of terminals, and groups the terminals based on types thereof.

To be specific, that a base station groups the terminals based on types thereof comprises: that the base station groups the terminals based on types thereof according to one or more of the following conditions: application purposes of the terminal, service types of the terminal, uplink service distribution of the terminal and data volume of PUSCH transmission of the terminal. It should be understood that the above conditions of classification are exemplary only, as other conditions are also applicable to this invention.

S120: the base station transmits pre-scheduling indication information and uplink scheduling commands to terminals in a group with a same type.

The terminals are grouped based on types thereof for the first time in Step S110, and the terminals in the same group are grouped for the second time in Step S120, for scheduling the chosen users.

To be specific, pre-scheduling indication information includes but is not limited to the following information: indication information of the scheduling group, wherein, the scheduling group is a subset of terminals in the type group.

That is, a type group is formed in the first time of grouping, and a scheduling group is formed in the second time of grouping.

To be specific, the base station transmits pre-scheduling information and an uplink scheduling command to terminals in the same type group in application scenarios including but not limited to:

Application Scenario 1: the base station informs all terminals in a type group with pre-scheduling indication information via PDSCH, and then the base station transmits a public uplink scheduling command to all terminals in the type group via PDCCH;

Application Scenario 2: the base station informs all MTC terminals in a type group with pre-scheduling indication information and a public uplink scheduling command via PDSCH;

Application Scenario 3: the base station informs all MTC terminals in a type group with pre-scheduling indication information and respective uplink scheduling command of each terminal in the type group via PDSCH.

S130: the base station receives a PUSCH transmitted by the terminal on a corresponding uplink sub-frame.

After obtaining an uplink scheduling command, the terminal transmits information to the base station via a PUSCH. The base station receives a PUSCH transmitted by the terminal on a corresponding uplink sub-frame, and then the base station transmits feedback information of receipt of PUSCH on a downlink sub-frame.

To be specific, that the base station transmits feedback information of receipt of PUSCH on a downlink sub-frame includes but is not limited to any of the following modes:

Feedback Mode 1: the base station transmits ACK or NACK feedback to the terminal via different PHICHs or ePHICHs; or Feedback Mode 2: the base station transmits NACK feedback via PDSCH to a terminal in the type group without a proper receipt.

Corresponding to the network side method, FIG. 2 shows a flow chart of the method for terminal side uplink packet scheduling in the examples of this invention comprising Steps S210 to S330:

S210: a terminal receives RNTI of a type group and IDs of members in the type group transmitted by a base station, and monitors PDCCH based on the RNTI.

In step S210, the terminal determine RNTI of the type group and IDs of members in the type group, receives information sent by the base station, and monitors PDCCH transmitted by the base station via the RNTI.

Besides, for example, after accessing the network, upon receiving an inquiry instruction about ability from the base station, the terminal reports the type group thereof to the base station, wherein the type group of the terminal comprises one or more of the following types:

application purposes of the terminal, service types of the terminal, uplink service distribution of the terminal and data volume of PUSCH transmission of the terminal. It should be understood that the above conditions of classification are exemplary only, as other conditions are also applicable to this invention.

S220: the terminal obtains pre-scheduling indication information according to PDSCH indicated by PDCCH.

The base station groups the terminals based on types thereof for the first time in step S210, and groups the terminals in the same group for the second time in step S220, for scheduling the chosen users.

To be specific, pre-scheduling indication information includes but is not limited to the following information:

indication information of the scheduling group, wherein the scheduling group is a subset of terminals in the type group.

That is, a type group is formed in the first time of grouping, and a scheduling group is formed in the second time of grouping.

To be specific, corresponding to Application Scenario 1, the terminal receives PDCCH based on the RNTI of the scheduling group so as to obtain an uplink scheduling command, wherein the uplink scheduling command is an identical public uplink scheduling command for each terminal in the scheduling group.

To be specific, corresponding to Application Scenario 2 and Application Scenario 3, the terminal obtaining pre-scheduling indication information and an uplink scheduling command based on PDSCH indicated by PDCCH comprises:

the terminal receives PDSCH at a corresponding time-frequency position based on PDCCH indication, descrambles PDSCH via RNTI, so as to obtain pre-scheduling indication information and an uplink scheduling command, wherein: the uplink scheduling command comprises any of the following modes:

the uplink scheduling command is an identical public uplink scheduling command for each terminal in the type group;

the uplink scheduling command is an uplink scheduling command for respective terminals.

S230: the terminal transmits the scheduled PUSCH on a corresponding uplink sub-frame.

After obtaining an uplink scheduling command, the terminal transmits information to the base station via PUSCH. The base station receives PUSCH transmitted by the terminal on a corresponding uplink sub-frame, and then the base station transmits feedback information of receipt of PUSCH on a downlink sub-frame, and the terminal receives feedback information of PUSCH.

To be specific, that the terminal receives feedback information of PUSCH comprises any of the following modes:

the terminal receives PHICH or ePHICH so as to obtain ACK or NACK feedback; and the terminal receives NACK feedback that is transmitted by PDSCH to a terminal in the type group without a proper receipt.

A further introduction to the above method of this invention will be given hereinafter in combination with specific application scenarios, by taking MTC terminals as an example. FIG. 3 shows a flow chart of the base station side method of Application Scenario 1, comprising the following steps:

S301: eNB sorts an accessed MTC terminal based on types thereof into a type group, and informs the MTC terminal with RNTI (Radio Network Temporary Identity) of the type group and member IDs of each MTC terminal in the type group.

Types of MTC terminals hereof are differentiated by application purposes of the MTC terminals. MTC terminals having same or similar application purposes may have same or similar service types, distribution rules of uplink services and data volume of each PUSCH transmission are also same or similar. Each type of MTC terminals correspond to a unique type ID, which may be obtained by eNB from the MTC terminals via RRC layer signaling, or from MME via S1 interface signaling, and then the type of MTC terminals can be determined.

The eNB informs the MTC terminal with the RNTI of the type group and IDs of members via an RRC layer message. The RNTI of the type group is the only 16-bit binary code word in the cell, and the RNTI of the type group should be different from any assigned RNTI in the cell for scrambling PDCCH. Length of member IDs is dependent upon the maximum number of members in the type group, if the maximum number of members is M, then the length of member IDs is $[\log_2 M]$ bits.

S302: the eNB informs all the MTC terminals in the type group with pre-scheduling indication information via PDSCH.

In case of a variety of contents carried by PDSCH as indicated by PDCCH that is scrambled via the RNTI of the type group in a cell, namely, there is information of other types aside from the pre-scheduling indication information, a specific field in PDSCH should be reserved for indications of contents carried by PDSCH.

The pre-scheduling indication information should at least comprise indication information of the scheduling group, RNTI of the scheduling group or index of the scheduling group, wherein the indication information of the scheduling group shall specify a scheduling group. The scheduling group is a set, formed by N (N≤M) MTC terminals arranged in sequence having similar or same channel state, and the N MTC terminals belong to a same type group. The MTC terminals in the scheduling group will be simultaneously scheduled via a public uplink scheduling command.

Herein, the eNB may decide channel state of the MTC terminal, by receiving a SRS (Sounding Reference Signal) and/or uplink a DMRS (Demodulation Reference Signal) of each MTC terminal. The eNB sorts MTC terminals into a scheduling group based on channel states thereof following a principle of: ensuring that MTC terminals sorted into the same scheduling group may obtain a target BLER (Block Error Ratio) via the same MCS when transmitting PUSCH.

The RNTI of the scheduling group is the only 16-bit binary code word in the cell, and the RNTI of the scheduling group should be different from any assigned RNTI in the cell for scrambling PDCCH. If the RNTI of the scheduling group is indirectly indicated by the index of the scheduling group, wherein the index of the scheduling group is greater or equivalent to an integer of 1, in that case:

the RNTI of the scheduling group=the RNTI of the type group±the index of the scheduling group.

A scrambling sequence of the PDSCH should be initialized by the RNTI of the type group of the type group, and CRC check bit of PDCCH for indicating the PDSCH should also be scrambled by the RNTI of the type group of the type group, so as to ensure that only MTC terminals in the type group can receive pre-scheduling indication information of the scheduling group.

S303: the eNB transmits a public uplink scheduling command to all the MTC terminals in the scheduling group via PDCCH.

The interval between the downlink sub-frame position where the PDCCH that carries the public uplink scheduling command resides and the downlink sub-frame position where the PDSCH that carries the pre-scheduling indication information resides shall be no less than a certain value, so as to guarantee enough time for the MTC terminal to decode the PDSCH that carries the pre-scheduling indication information.

The CRC check bit of PDCCH that carries the public uplink scheduling command should be scrambled by the RNTI of the scheduling group.

The public uplink scheduling command should at least carry public MCS and public uplink resources for the uplink PUSCH transmission in the scheduling group. All the MTC terminals in the scheduling group employ the public MCS to transmit the scheduled PUSCH. The public uplink resource is the sum of time-frequency resources assigned to all the MTC terminals in the scheduling group. The smallest unit of the public uplink resource indication is a Physical Resource Block (PRB). PUSCH of each MTC terminal in the scheduling group occupies same size of time-frequency resource, namely, if the total amount of PRBs indicated in the public uplink scheduling command is K, then PUSCH of each MTC takes up K/N PRBs, the K/N PRBs is regarded as a sub-resource block. As shown in FIG. 9, the public uplink scheduling command instructs a total of N sub-resource blocks, the $l^{th}$ MTC terminal in the scheduling group occupies the $l^{th}$ sub-resource block among the N sub-resource blocks.

S304: the eNB receives PUSCH transmitted by MTC terminals in the scheduling groups on a corresponding uplink sub-frame.

The eNB descrambles the received PUSCH via the scrambling sequence initialized by the RNTI of the scheduling group. Alternatively, with respect to each MTC terminal, C-RNTI of such MTC terminal is used for initializing the scrambling sequence to descramble the corresponding PUSCH.

S305: the eNB transmits ACK/NACK feedback information of the PUSCH on a downlink sub-frame.

The downlink sub-frame and the uplink sub-frame where the PUSCH resides shall be at an interval of a certain number sub-frames, for example, two sub-frames, or take another example, by reference to the time interval between PHICH and PUSCH as defined in 3GPP Rel-8.

Feedback Mode 1: the ACK/NACK is carried by PHICH/ ePHICH, to be specific, each MTC terminal in packet scheduling or multiple MTC terminals that share one PRB correspond to a single PHICH/ePHICH channel, the eNB transmits ACK/NACK feedback to a corresponding MTC terminal via different PHICH/ePHICH channels.

Feedback Mode 2: the ACK/NACK information is carried by PDSCH instructed by PDCCH being scrambled by the RNTI of the scheduling group, the PDSCH is still scrambled by a scrambling sequence initialized by the RNTI of the scheduling group. The PDSCH indicates a secondary scheduling group, which is formed by N' (N'≤N) MTC terminals arranged in sequence, where the N' MTC terminals are MTC terminals in the scheduling group without a proper receipt of the PUSCH.

S306: if Mode 2 is adopted in S 305 and N'>0, the eNB may perform S 303 to S 305 repeatedly.

Then, the interval between the downlink sub-frame position where the public uplink scheduling command resides and the downlink sub-frame position where the PDSCH that instructs the secondary scheduling group resides shall meet the requirement in S 303 for the time interval between the downlink sub-frame position where the public uplink scheduling command resides and the downlink sub-frame position where the pre-scheduling indication resides.

Corresponding to the eNB side method for packet scheduling based on pre-scheduling of Application Scenario 1, FIG. 4 shows a flow chart of the terminal side method of Application Scenario 1, comprising the following steps:

S401: after accessing the LTE network, upon receiving an inquiry instruction about ability from the eNB, the MTC terminal reports its type to the eNB.

Type of a MTC terminal depends upon application purposes of the MTC terminal. MTC terminals with same or similar application purposes may have same or similar service type, and data volume of PUSCH transmission once will be same or similar, thereby facilitating assigning uplink time-frequency resources to each MTC terminal in an equally distributing manner. MTC terminal of each type is corresponding to a unique type ID which is written into the MTC terminal memory at factory. The MTC terminal reports the type ID to the eNB via RRC layer signaling.

S402: the MTC terminal receives eNB signaling, and obtains type group RNTI of the type group it belongs, as well as member IDs of the type group.

S403: the MTC terminal monitors PDCCH scrambled by the RNTI of the type group on an available downlink sub-frame.

If the MTC terminal detects PDCCH scrambled by the RNTI of the type group it belongs to, it receives the PDSCH at a corresponding time-frequency position indicated by the PDCCH, and descrambles the PDSCH via the RNTI of the type group.

In case of a variety of contents carried by PDSCH as indicated by PDCCH that is scrambled via the RNTI of the type group in a cell, namely, there is information of other types aside from the pre-scheduling indication information, the MTC terminal decides whether the content carried by PDSCH is pre-scheduling indication information by detecting the specific field reserved in PDSCH. Otherwise, the MTC terminal deems any detected information that is carried by PDSCH instructed by PDCCH that is scrambled by the RNTI of the type group as pre-scheduling indication information.

The pre-scheduling indication information should at least comprise indication information of the scheduling group, RNTI of the scheduling group or index of the scheduling group, wherein the indication information of the scheduling group shall specify a scheduling group. The scheduling group is a set, formed by N MTC terminals arranged in sequence having similar or same channel state. The RNTI of the scheduling group is the only 16-bit binary code word in the cell, and the RNTI of the scheduling group should be different from any assigned RNTI in the cell for scrambling PDCCH. If the RNTI of the scheduling group is indirectly indicated by the index of the scheduling group, wherein the index of the scheduling group is greater or equivalent to an integer of 1, in that case:

the RNTI of the scheduling group=the RNTI of the type group±the index of the scheduling group.

In case it is pre-scheduling indication information that is carried by the PDSCH, and the MTC terminal is comprised in the scheduling group indicated by the pre-scheduling indication information, the current pre-scheduling indication information is recognized by the MTC terminal as relevant pre-scheduling indication information.

S404: if the MTC terminal is provided with effective pre-scheduling indication information corresponding thereto on an available downlink sub-frame n, it monitors an uplink DCI format scrambled by the RNTI of the scheduling group in the effective pre-scheduling indication information on a sub-frame n.

Effective pre-scheduling indication information refers to relevant pre-scheduling indication information received on a downlink sub-frame m, wherein the relationship between m and n is configured by a high-layer signaling or directly set by protocols. For instance, if the pre-scheduling indication information is used for indicating uplink packet scheduling only once, a downlink sub-frame n is the first sub-frame with a frame number meeting the requirement n≥m+$M_n$; however, if the pre-scheduling indication information can be used for indicating uplink packet scheduling in a period of time, then m is the greatest integer within the region (n-$M_x$, n-$M_n$); wherein $M_x$ and $M_n$ are configured by a high-layer signaling or directly set by protocols.

The uplink DCI format should carry a public uplink scheduling command which should at least carry public MCS and public uplink resources for the uplink PUSCH transmission in the scheduling group. The public uplink resource is a sum of time-frequency resources that are assigned to all the MTC terminals in the scheduling group, where the smallest unit indicated by the public uplink resource is a PRB (Physical Resource Block). The MTC terminal performs S405 if it detects on the sub-frame n the uplink DCI format scrambled by the RNTI of the scheduling group.

S405: the MTC terminal transmits the scheduled PUSCH according to pre-scheduling indication information and public uplink scheduling command information.

The pre-scheduling indication information refers to pre-scheduling indication information corresponding to the public scheduling instruction on sub-frame m and sub-frame n.

PUSCH of each MTC terminals in the scheduling group occupies same size of time-frequency resource, namely, if the total amount of PRBs indicated by the public uplink scheduling command on downlink sub-frame n is K, then PUSCH of each MTC terminal occupies K/N PRBs respectively, the K/N PRBs is regarded as a sub-resource block, as shown in FIG. 9, the public uplink scheduling command indicates in total of N sub-resource blocks, if the MTC terminal in the scheduling group indicated by the effective pre-scheduling information at the sub-frame m position is arranged as l, in that case, the MTC terminal occupies the $l^{th}$ sub-resource block among the N sub-resource blocks.

The scheduled PUSCH adopts MCS as specified by the public uplink scheduling command information. In addition, the PUSCH should be scrambled by a scrambling sequence initialized by the RNTI of the scheduling group or C-RNTI of the MTC terminal.

S406: the UE receives ACK/NACK feedback information of the PUSCH on a downlink sub-frame.

The downlink sub-frame and the uplink sub-frame on which the UE transmits PUSCH shall be at an interval of a certain number sub-frames, for instance, by reference to the time interval between PHICH and PUSCH as defined in 3GPP Rel-8.

According to a mode for carrying out this invention (Mode 1), the ACK/NACK is carried by PHICH/ePHICH, to be specific, the MTC detects the corresponding PHICH/ePHICH channel, and obtains ACK/NACK feedback from PUSCH by decoding the corresponding PHICH/ePHICH channel.

According to another mode for carrying out this invention (Mode 2), the MTC terminal obtains the ACK/NACK information by receiving PDSCH indicated by the PDCCH that is scrambled by the RNTI of the scheduling group. The PDSCH is still scrambled by the scrambling sequence initialized by the RNTI of the scheduling group. The PDSCH specifies a secondary scheduling group which is formed by N' (N'≤N) MTC terminals arranged in sequence. If the MTC group is comprised in the secondary scheduling group, the MTC terminal confirms improper receipt of PUSCH; otherwise, the MTC terminal confirms a proper receipt of PUSCH.

S407: if S406 adopt Mode 2, and the MTC terminal is comprised in a secondary scheduling group, in that case, the MTC terminal repeats S404 to S406.

Then, m reprovides the downlink sub-frame where the PDSCH that carries the secondary scheduling group resides.

The uplink packet scheduling can also be carried out by the following method: the eNB transmits pre-scheduling instruction and a public uplink scheduling command simultaneously to all MTC terminals in a type group via PDSCH, wherein the pre-scheduling instruction is used for creating a scheduling group, and the public uplink scheduling command is used for scheduling uplink transmission of MTC terminals in the group. FIG. 5 shows a flow chart of the base station side method of Application Scenario 2, comprising the following Ss:

S501: eNB sorts an accessed MTC terminal based on types thereof into a type group, and informs the MTC terminal with the RNTI of the type group and member IDs of the type group of each MTC terminal in the type group.

Herein, the types of MTC terminals are differentiated by application purposes of the MTC terminals. The MTC terminals having same or similar application purposes may have same or similar service types, distribution rules of uplink services and data volume of each PUSCH transmission are also same or similar. Each type of MTC terminals correspond to a unique type ID, which can be obtained by eNB from the MTC terminals via RRC layer signaling, or from MME via S1 interface signaling, and then the type of MTC terminals can be determined.

The eNB informs the MTC terminal with the RNTI of the type group and IDs of members via an RRC layer message. The RNTI of the type group is the only 16-bit binary code word in the cell, and the RNTI of the type group should be different from any assigned RNTI in the cell for scrambling PDCCH. Length of member IDs is dependent upon the maximum number of members in the type group, if the maximum number of members is M, then the length of member IDs is $[\log_2 M]$ bits.

S502: the eNB informs all MTC terminals in the type group with pre-scheduling indication information and a public uplink scheduling command via PDSCH.

In case of a variety of contents carried by PDSCH as indicated by PDCCH that is scrambled via the RNTI of the type group in a cell, namely, there is information of other types aside from the pre-scheduling indication information and uplink scheduling command, a specific field in PDSCH should be reserved for indications of contents carried by PDSCH.

The pre-scheduling indication information should at least comprise indication information of the scheduling group, wherein the indication information of the scheduling group shall specify a scheduling group. The scheduling group is a set, formed by N (N≤M) MTC terminals arranged in sequence having similar or same channel state, the N MTC terminals belonging to a same type group. The MTC terminals in the scheduling group will be simultaneously scheduled via a public uplink scheduling command.

If, in S504 that follows, the eNB feeds back ACK/NACK information of PUSCH by Feedback Mode 2, the pre-scheduling indication information should comprise RNTI of the scheduling group or index of the scheduling group, where the RNTI of the scheduling group is the only 16-bit binary code word in the cell, which is different from any assigned RNTI in the cell for scrambling PDCCH; if the RNTI of the scheduling group is indirectly indicated by the index of the scheduling group, wherein the index of the scheduling group is an integer≥1, in that case:

the RNTI of the scheduling group=the RNTI of the type group±the index of the scheduling group.

Herein, the eNB may decide channel state of the MTC terminal by receiving SRS and/or SINR of uplink DMRS of each MTC terminal. The eNB sorts the MTC terminal into a scheduling group based on channel state thereof following a principle of: ensuring that MTC terminals sorted into the same scheduling group may obtain a target BLER via the same MCS when transmitting PUSCH.

The public uplink scheduling command should at least carry public MCS and public uplink resources for the uplink PUSCH transmission in the scheduling group. All the MTC terminals in the scheduling group employ the public MCS to transmit the scheduled PUSCH. The public uplink resource is a sum of time-frequency resources assigned to all the MTC terminals in the scheduling group. The smallest unit of the public uplink resource instruction is a PRB. PUSCH of each MTC terminal in the scheduling group occupies same size of time-frequency resource, namely, if the total amount of PRBs instructed in the public uplink scheduling command is K, then PUSCH of each MTC terminal occupies K/N PRBs, the K/N PRBs is regarded as a sub-resource block. As shown in FIG. 9, the public uplink scheduling command instructs a total of N sub-resource blocks, the $l^{th}$ MTC terminal occupies the $l^{th}$ sub-resource block among the N sub-resource blocks.

A scrambling sequence of the PDSCH should be initialized by the RNTI of the type group of the type group, and CRC check bit of PDCCH for instructing the PDSCH should also be scrambled by the RNTI of the type group of the type group, so as to ensure that only MTC terminals in the type group can receive pre-scheduling indication information of the scheduling group.

S503: the eNB receives PUSCH transmitted by MTC terminals in the scheduling groups on a corresponding uplink sub-frame.

The time interval between the uplink sub-frame and the downlink sub-frame where the PDSCH that carries pre-scheduling indication information and a public uplink scheduling command resides shall be no less than a specific value, so as to ensure that MTC terminals in the type group can decode the PDSCH to obtain the pre-scheduling indication information and the public uplink scheduling command. For example, according to the random access process stipulated by the prior LTE specification, the time interval between a downlink sub-frame where RAR (Random Access Response) resides and an uplink sub-frame where Message 3 scheduled by RAR resides should be no less than 6 ms, a specific value can be set at 6 ms by reference to the requirement of the process.

S504: the eNB transmits ACK/NACK feedback information of the PUSCH on a downlink sub-frame.

The downlink sub-frame and the uplink sub-frame where the PUSCH resides shall be at an interval of a certain number sub-frames, for instance, by reference to the time interval between PHICH and PUSCH as defined in 3GPP Rel-8.

Feedback Mode 1: the ACK/NACK is carried by PHICH/ePHICH, to be specific, each MTC terminal in packet scheduling or multiple MTC terminals that share one PRB are corresponding to a single PHICH/ePHICH channel, the eNB transmits ACK/NACK feedback to a corresponding MTC terminal via different PHICH/ePHICH channels.

Feedback Mode 2: the ACK/NACK information is carried by PDSCH instructed by PDCCH scrambled by the RNTI of the scheduling group, and the PDSCH is still scrambled by a scrambling sequence initialized by the RNTI of the scheduling group. The PDSCH indicates a secondary scheduling group, which is formed by N' (N'≤N) MTC terminals arranged in sequence, where the N' MTC terminals are MTC terminals without a proper receipt.

In case of N'>0, the PDSCH should at the same time carry public scheduling indication information for scheduling MTC terminals in the secondary scheduling group. The format and way of explanation of the public scheduling indication information are same as in S502. The eNB may perform S503 and S504 repeatedly.

FIG. 6 shows a flow chart of the terminal side method of Application Scenario 2, corresponding to the eNB side method for packet scheduling based on pre-scheduling of Application Scenario 2, comprising the following steps:

S601: after accessing the LTE network, upon receiving an inquiry instruction about ability from the eNB, the MTC terminal reports its type to the eNB.

Type of a MTC terminal depends upon application purposes of the MTC terminal. The MTC terminals with same or similar application purposes may have same or similar service type, and data volume of PUSCH transmission once will be same or similar, thereby facilitating assigning uplink time-frequency resources to each MTC terminal in an equally distributing manner. MTC terminal of each type is corresponding to a unique type ID which is written into the MTC terminal memory at factory. The MTC terminal reports the type ID to the eNB via RRC layer signaling.

S602: the MTC terminal receives eNB signaling, and obtains type group RNTI of the type group it belongs, as well as member IDs of the type group.

S603: the MTC terminal monitors PDCCH scrambled by the RNTI of the type group on an available downlink sub-frame.

If the MTC terminal detects PDCCH scrambled by RNTI of the type group it belongs to, it receives the PDSCH at a corresponding time-frequency position indicated by the PDCCH, and descrambles the PDSCH via the RNTI of the type group.

In case of a variety of contents carried by PDSCH as indicated by PDCCH that is scrambled via the RNTI of the type group in a cell, namely, there is information of other types aside from the pre-scheduling indication information and the uplink scheduling command, the MTC terminal decides whether the content carried by PDSCH is pre-scheduling indication information and a public uplink scheduling command by detecting the specific field reserved in PDSCH. Otherwise, the MTC terminal deems any detected information that is carried by PDSCH instructed by PDCCH that is scrambled by the RNTI of the type group as pre-scheduling indication information and a public uplink scheduling command.

The pre-scheduling indication information shall at least comprise indication information of a scheduling group, wherein the indication information of the scheduling group shall specify a scheduling group. The scheduling group is a set, formed by N MTC terminals arranged in sequence having similar or same channel state.

The public uplink scheduling command should at least carry public MCS and public uplink resources for the uplink PUSCH transmission in the scheduling group.

S604: if the MTC terminal is comprised in a scheduling group instructed by the pre-scheduling indication information, the MTC terminal transmits the scheduled PUSCH on a corresponding uplink sub-frame.

The interval between the uplink sub-frame position at which the MTC terminal transmits PUSCH and the downlink sub-frame position where the packet scheduling indication resides shall be no less than a certain value. The scheduled PUSCH adopts MCS as specified in the public uplink scheduling instruction information.

The MTC terminal determines the time-frequency resource position where the scheduled PUSCH resides based on the position of the MTC in the scheduling group as well the time-frequency resource instruction indication in the public uplink scheduling instruction. The public uplink resource is the sum of time-frequency resources assigned to all the MTC terminals in the scheduling group. The smallest unit of the public uplink resource instruction is a PRB. The PUSCH of each MTC terminal in the scheduling group occupies same size of time-frequency resource, namely, if the total amount of PRBs instructed in the public uplink scheduling command is K, then PUSCH of each MTC terminal occupies K/N PRBs, the K/N PRBs is regarded as a sub-resource block. As shown in FIG. 9, the public uplink scheduling command instructs a total of N sub-resource blocks, the $l^{th}$ MTC terminal occupies the $l^{th}$ sub-resource block among the N sub-resource blocks.

S605: the MTC terminal receives ACK/NACK feedback information of the PUSCH on a downlink sub-frame.

The downlink sub-frame and the uplink sub-frame where the PUSCH resides shall be at an interval of a certain number of sub-frames, for instance, by reference to the time interval between PHICH and PUSCH as defined in 3GPP Rel-8.

Feedback Mode 1: the ACK/NACK is carried by PHICH/ePHICH, to be specific, the MTC detects the corresponding PHICH/ePHICH channel, and obtains ACK/NACK feedback from PUSCH by decoding the corresponding PHICH/ePHICH channel.

Feedback Mode 2: the MTC terminal obtains the ACK/NACK information by receiving PDSCH indicated by the PDCCH that is scrambled by the RNTI of the scheduling group. The PDSCH is still scrambled by the scrambling sequence initialized by the RNTI of the scheduling group. The PDSCH specifies a secondary scheduling group which is formed by N' (N'≤N) MTC terminals arranged in sequence. If the MTC group is comprised in the secondary scheduling group, the MTC terminal confirms improper receipt of PUSCH; otherwise, the MTC terminal confirms a proper receipt of PUSCH.

If the MTC terminal is comprised in a secondary scheduling group, the MTC terminal further decodes public scheduling indication information carried by the PDSCH. Herein, the format and the way of explanation of the public scheduling indication information are same as in S603 and S604. The MTC may perform S604 and S605 repeatedly.

The uplink packet scheduling can also be carried out by the following method: the eNB transmits pre-scheduling instruction and a uplink scheduling command specific to each MTC terminal in the scheduling group simultaneously to all MTC terminals in a type group via PDSCH, wherein the pre-scheduling instruction is used for creating a scheduling group, and each MTC terminal in the scheduling group has an individual uplink scheduling command corresponding thereto for scheduling uplink transmission of the MTC terminals in the scheduling group. FIG. 7 shows a flow chart of the base station side method of Application Scenario 3, comprising the following steps:

S701: eNB sorts an accessed MTC terminal based on types thereof into a type group, and informs the MTC terminal with the RNTI of the type group and member IDs of the type group of each MTC terminal in the type group.

Herein, the types of MTC terminals are differentiated by application purposes of the MTC terminals. MTC terminals having same or similar application purposes may have same or similar service types, distribution rules of uplink services and data volume of each PUSCH transmission are also same or similar. Each type of MTC terminals correspond to a unique type ID, which can be obtained by eNB from the MTC terminals via RRC layer signaling, or from MME via S1 interface signaling, and then the type of MTC terminals can be determined.

The eNB informs the MTC terminal with the RNTI of the type group and IDs of members via an RRC layer message. The RNTI of the type group is the only 16-bit binary code word in the cell, and the RNTI of the type group should be different from any assigned RNTI in the cell for scrambling PDCCH. Length of member IDs is dependent upon the maximum number of members in the type group, if the maximum number of members is M, then the length of member IDs is $[\log_2 M]$ bits.

S702: the eNB informs all MTC terminals in the type group with pre-scheduling indication information and an uplink scheduling command specific to each MTC terminal in the scheduling group via PDSCH.

The contents carried by the PDSCH can be divided into two portions: the pre-scheduling indication information portion, and the uplink scheduling command portion. In case of a variety of contents carried by PDSCH as indicated by PDCCH that is scrambled via the RNTI of the type group in a cell, namely, there is information of other types aside from part of the pre-scheduling indication information and part of the uplink scheduling command, a specific field in PDSCH should be reserved for indications of contents carried by PDSCH.

The pre-scheduling indication information should at least comprise indication information of the scheduling group, wherein the indication information of the scheduling group shall specify a scheduling group. The scheduling group is a set, formed by N (N≤M) MTC terminals arranged in sequence, the N MTC terminals belonging to a same type group. The MTC terminals in the scheduling group will be simultaneously scheduled via a corresponding uplink scheduling command.

The uplink scheduling command portion is composed by N uplink scheduling commands having the same number of bytes individually, corresponding one by one to the N MTC terminals in the scheduling group, as shown in FIG. 10. An uplink scheduling command corresponding to each MTC terminal should at least comprise MCS and time-frequency resource necessary for PUSCH transmission of the MTC.

A scrambling sequence of the PDSCH should be initialized by the RNTI of the type group of the type group, and CRC check bit of PDCCH for instructing the PDSCH should also be scrambled by the RNTI of the type group of the type group, so as to ensure that only MTC terminals in the type group can receive pre-scheduling indication information of the scheduling group.

S703: the eNB receives PUSCH transmitted by MTC terminals in the scheduling groups on a corresponding uplink sub-frame.

The time interval between the uplink sub-frame and the downlink sub-frame where the PDSCH that carries pre-scheduling indication information and a public uplink scheduling command resides shall be greater than a specific value, so as to ensure that the MTC terminals in the type group can decode the PDSCH to obtain the pre-scheduling indication information and the public uplink scheduling command.

S704: the eNB transmits ACK/NACK feedback information of the PUSCH on a downlink sub-frame.

The downlink sub-frame and the uplink sub-frame where the PUSCH resides shall be at an interval of a certain number of sub-frames, for instance, by reference to the time interval between PHICH and PUSCH as defined in 3GPP Rel-8.

Feedback Mode 1: the ACK/NACK is carried by PHICH/ePHICH, to be specific, each MTC terminal in packet scheduling or multiple MTC terminals that share one PRB are corresponding to a single PHICH/ePHICH channel, the eNB transmits ACK/NACK feedback to a corresponding MTC terminal via different PHICH/ePHICH channels.

Feedback Mode 2: the ACK/NACK information is carried by PDSCH instructed by PDCCH scrambled by the RNTI of the scheduling group, the PDSCH is still scrambled by a scrambling sequence initialized by the RNTI of the scheduling group. The PDSCH specifies a secondary scheduling group, which is formed by N' (N'≤N) MTC terminals arranged in sequence, where the N' MTC terminals are MTC terminals without a proper receipt.

In case of N'>0, the PDSCH should at the same time carry public scheduling indication information for scheduling MTC terminals in the secondary scheduling group. The format and way of explanation of the public scheduling indication information are same as in S702. The eNB may perform S703 and S704 repeatedly.

FIG. 8 shows a flow chart of the terminal side method of Application Scenario 3, corresponding to the eNB side method for packet scheduling based on pre-scheduling of Application Scenario 3:

S801: after accessing the LTE network, upon receiving an inquiry instruction about ability from the eNB, the MTC terminal reports its type to the eNB.

Type of a MTC terminal depends upon application purposes of the MTC terminal. MTC terminals with same or similar application purposes may have same or similar service type, and data volume of PUSCH transmission once will be same or similar, thereby facilitating assigning uplink time-frequency resources to each MTC terminal in an equally distributing manner. MTC terminal of each type is corresponding to a unique type ID which is written into the MTC terminal memory at factory. The MTC terminal reports the type ID to the eNB via RRC layer signaling.

S802: the MTC terminal receives eNB signaling, and obtains type group RNTI of the type group it belongs, as well as member IDs of the type group.

S803: the MTC terminal monitors PDCCH scrambled by the RNTI of the type group on an available downlink sub-frame.

If the MTC terminal detects PDCCH scrambled by the RNTI of the type group it belongs to, it receives the PDSCH at a corresponding time-frequency position indicated by the PDCCH, and descrambles the PDSCH via the RNTI of the type group.

The contents carried by the PDSCH can be divided into two portions: the pre-scheduling indication information portion, and the uplink scheduling command portion. In case of a variety of contents carried by PDSCH as indicated by PDCCH that is scrambled via the RNTI of the type group in a cell, namely, there is information of other types aside from the pre-scheduling indication information and the uplink scheduling command, the MTC terminal decides whether the content carried by PDSCH is pre-scheduling indication information and an uplink scheduling command by detecting the specific field reserved in PDSCH. Otherwise, the MTC terminal deems any detected information that is carried by PDSCH instructed by PDCCH that is scrambled by the RNTI of the type group as pre-scheduling indication information and an uplink scheduling command.

The pre-scheduling indication information should at least comprise indication information of the scheduling group, wherein the indication information of the scheduling group shall specify a scheduling group. The scheduling group is a set, formed by N (N≤M) MTC terminals arranged in sequence, the N MTC terminals belonging to a same type group. The MTC terminals in the scheduling group will be simultaneously scheduled via a corresponding uplink scheduling command.

The uplink scheduling command portion is composed by N uplink scheduling commands having the same number of bytes individually, corresponding one by one to the N MTC terminals in the scheduling group, as shown in FIG. 10. An uplink scheduling command corresponding to each MTC terminal should at least comprise MCS and time-frequency resource necessary for PUSCH transmission of the MTC.

S804: if the MTC terminal is comprised in a scheduling group instructed by the pre-scheduling indication information, the MTC terminal transmits the scheduled PUSCH on a corresponding uplink sub-frame.

The interval between the uplink sub-frame position at which the MTC terminal transmits PUSCH and the downlink sub-frame position where the packet scheduling indication resides shall be no less than a certain value. The scheduled PUSCH adopts MCS specified in the uplink scheduling command corresponding thereto, and is transmitted on time-frequency resource as indicated by the uplink scheduling command corresponding thereto.

S805: the MTC terminal receives ACK/NACK feedback information of the PUSCH on a downlink subframe.

The downlink sub-frame and the uplink sub-frame where the PUSCH resides shall be at an interval of a certain number of sub-frames, for instance, by reference to the time interval between PHICH and PUSCH as defined in 3GPP Rel-8.

According to a mode for carrying out this invention (Mode 1), the ACK/NACK is carried by PHICH/ePHICH, to be specific, the MTC detects the corresponding PHICH/ePHICH channel, and obtains ACK/NACK feedback from PUSCH by decoding the corresponding PHICH/ePHICH channel.

According to another mode for carrying out this invention (Mode 2), the MTC terminal obtains the ACK/NACK information by receiving PDSCH indicated by the PDCCH that is scrambled by the RNTI of the scheduling group. The PDSCH is still scrambled by the scrambling sequence initialized by the RNTI of the scheduling group. The PDSCH specifies a secondary scheduling group which is formed by N' (N'≤N) MTC terminals arranged in sequence. If the MTC group is comprised in the secondary scheduling group, the MTC terminal confirms improper receipt of PUSCH; otherwise, the MTC terminal confirms a proper receipt of PUSCH.

If the MTC terminal is comprised in a secondary scheduling group, the MTC terminal further decodes public scheduling indication information carried by the PDSCH. Herein, the format and the way of explanation of the public scheduling indication information are same as in S803 and S804. The MTC may perform S804 and S805 repeatedly.

As shown in FIG. 11, this invention also provides in the examples, corresponding to the above method, a base station device 100, comprising: a grouping module 110, a receiving module 120 and a transmitting module 130, wherein, the grouping module 110 is used for determining type of a terminal, and sorting the terminal into a type group;

the transmitting module 130 is used for transmitting pre-scheduling indication information and uplink scheduling commands to the terminals in the same type group;

the receiving module 120 is used for receiving PUSCH transmitted by the terminals on a corresponding uplink sub-frame.

As an example of the base station 100, that the grouping module 110 groups terminals based on types thereof comprises: that the grouping module 110 groups terminals based on types thereof according to one or more of the following conditions:

application purposes of terminals, service types of terminals, uplink service distribution of terminals and data volume of PUSCH transmission of terminals.

As an example of the base station 100, pre-scheduling indication information comprises one piece or more pieces of the following information:

indication information of the scheduling group and RNTI of the scheduling group, wherein the scheduling group is a subset of terminals in the type group.

As an example of the base station 100, the transmitting module 130 being used for transmitting scheduling information and uplink scheduling commands to terminals in the same type group comprises any of the following modes:

that the transmitting module 130 is used for informing all terminals in the type group with pre-scheduling indication information via PDSCH, and then the transmitting module 130 is further used for transmitting a public uplink scheduling command to all terminals in the type group via PDCCH;

that the transmitting module 130 is used for informing all MTC terminals in the type group with pre-scheduling indication information and a public uplink scheduling command via PDSCH; or that the transmitting module 130 is used for informing all MTC terminals in the type group with pre-scheduling indication information and respective uplink scheduling command of each terminal in the type group via PDSCH.

The terminal 100 as an example further comprises:

that the transmitting module 130 is further used for transmitting receipt feedback information of the PUSCH on a downlink sub-frame.

As an example of the base station 100, the transmitting module 130 being used for transmitting feedback information of receipt of PUSCH on a downlink sub-frame comprise any of the following modes:

that the transmitting module 130 is used for transmitting ACK or NACK feedback to the terminal via different PHICHs or ePHICHs; or that the transmitting module 130 is used for transmitting NACK feedback via PDSCH to a terminal in the type group without a proper receipt.

As shown in FIG. 12, this invention also provides in the examples, corresponding to the above method of Application Scenario 1, a terminal 200, comprising: a receiving module 210 and a transmitting module 220, wherein, the receiving module 210 is used for receiving RNTI of a type group and IDs of members in the type group transmitted by a base station, and monitoring PDCCH transmitted by the base station based on the RNTI, and for receiving pre-scheduling indication information according to PDSCH indicated by PDCCH;

the transmitting module 220 is used for transmitting PUSCH on a corresponding uplink sub-frame.

The terminal 200 as an example further comprises:

for example, after accessing the network, upon receiving an inquiry instruction about ability from the base station, the transmitting module 220 is further used for reporting the type group of the terminal, wherein, the type group of the terminal comprises one or more of the following types:

application purposes of the terminal, service types of the terminal, distribution of uplink services of the terminal and data volume of PUSCH transmission of the terminal.

As an example of the terminal 200, pre-scheduling indication information comprises any one piece or more pieces of the following information:

indication information of the scheduling group, RNTI of the scheduling group and index of the scheduling group, wherein the scheduling group is a subset of terminals in the type group.

If the RNTI of the scheduling group is indirectly indicated by the index of the scheduling group, wherein the index of the scheduling group is greater or equivalent to an integer of 1, in that case the RNTI of the scheduling group=the RNTI of the type group±the index of the scheduling group.

As an example of the terminal 200, the receiving module 210 is used for receiving pre-scheduling indication information based on PDSCH indicated by PDCCH:

the receiving module 210 is used for receiving PDSCH at a corresponding time-frequency position based on indication of the PDCCH, and descrambling the PDSCH via the RNTI to receive pre-scheduling indication information;

as an example of the terminal 200, the receiving module 210 is used for receiving PDCCH based on a RNTI of the scheduling group in the pre-scheduling indication information to obtain an uplink scheduling command, wherein:

the uplink scheduling command is an identical public uplink scheduling command for each terminal in the scheduling group;

as an example of the terminal 200, the receiving module 210 is further used for receiving feedback information of PUSCH.

As an example of the terminal 200, the receiving module 210 being further used for receiving feedback information of PUSCH comprises any of the following modes:

the receiving module 210 is used for receiving PHICH or ePHICH so as to obtain ACK or NACK feedback; or the receiving module 210 is used for receiving NACK feedback that is transmitted by PDSCH to a terminal in the type group without a proper receipt.

Corresponding to the above method of Application Scenario 2 or 3, as shown in FIG. 13, this invention also provides in the examples, a terminal 300, comprising: a receiving module 310 and a transmitting module 320, wherein, the receiving module 310 is used for receiving RNTI of a type group and IDs of members in the type group transmitted by a base station, and monitoring PDCCH transmitted by the base station based on the RNTI, and for receiving pre-scheduling indication information and an uplink scheduling command according to PDSCH indicated by PDCCH;

the transmitting module 320 is used for transmitting PUSCH on a corresponding uplink sub-frame.

The terminal 300 as an example further comprises:

for example, after the terminal 300 accesses the network, upon receiving an inquiry instruction about ability from the base station, the transmitting module 320 is further used for reporting the type group of the terminal 300, wherein, the type group of the terminal 300 comprises one or more of the following types:

application purposes of the terminal 300, service types of terminal 300, distribution of uplink services of the terminal 300 and data volume of PUSCH transmission of the terminal 300.

As an example of the terminal 300, pre-scheduling indication information comprises one piece or more pieces of the following information:

indication information of the scheduling group, RNTI of the scheduling group and index of the scheduling group, wherein the scheduling group is a subset of terminals in the type group. If the RNTI of the scheduling group is indirectly indicated by the index of the scheduling group, wherein the index of the scheduling group is greater or equivalent to an integer of 1, in that case:

the RNTI of the scheduling group=the RNTI of the type group±the index of the scheduling group.

As an example of the terminal 300, the receiving module 310 being used for receiving pre-scheduling indication information and an uplink scheduling command based on PDSCH indicated by PDCCH comprises:

the receiving module 310 for receiving PDSCH at a corresponding time-frequency position based on PDCCH indication, descrambling PDSCH via RNTI to receive pre-scheduling indication information and an uplink scheduling command, wherein, the uplink scheduling command comprises any of the following modes:

the uplink scheduling command is an identical public uplink scheduling command for each terminal 300 in the type group;

the uplink scheduling command is an uplink scheduling command for respective terminals 300.

As an example of the terminal 300, the receiving module 310 is further used for receiving feedback information of PUSCH.

As an example of the terminal 300, the receiving module 310 being further used for receiving feedback information of PUSCH comprises any of the following modes:

the receiving module 310 is used for receiving PHICH or ePHICH so as to obtain ACK or NACK feedback; and the receiving module 310 is used for receiving NACK feedback that is transmitted by PDSCH to the terminal 300 in the type group without a proper receipt.

The above method or device presented by this invention schedules terminal PUSCH transmissions in batches after classifying the terminals. In the above solution provided by this invention, eNB sorts accessed MTC terminals into different type groups based on types thereof via a high-layer signaling, part of the MTC terminals in a type group are assigned to a scheduling group via a pre-scheduling instruction carried by PDSCH, all the MTC terminals in that group are scheduled via an uplink scheduling command; the MTC terminals determine the type group and the scheduling group thereof by receiving a high-layer signaling and a pre-scheduling instruction carried by PDSCH, followed by receiving an uplink scheduling command, and transmitting the scheduled PUSCH according to the uplink scheduling command and the pre-scheduling instruction. The method or device presented by this invention can obviously reduce the number of times for the base station to transmit uplink scheduling commands, and alleviate the burden on the base station of scheduling PUSCH transmission of MTC terminals. Moreover, the solution provided by this invention is simple to be carried out and high efficient, which barely changes the prior system, and exerts no influence on the system compatibility.

An ordinary person skilled in the art may understand that, the invention may relate to equipment for executing one or more operations described in the application. The equipment may be specially designed and manufactured for the required purpose, or may also include the known equipment in general purpose computers that are selectively activated or reconstructed by programs stored therein. Such computer programs may be stored in device (for example, computer) readable medium or in any type of medium suitable for storing electronic instructions and respectively coupled to the bus. The computer readable medium may include but is not limited to any type of disk (including floppy disk, hard disk, CD, CD-ROM and magneto-optic disk), Random Access Memory (RAM), Read-Only Memory (ROM), electrically programmable ROM, electrically erasable ROM (EPROM), electrically erasable programmable ROM (EEPROM), flash memory, magnetic card or light card. The readable medium includes any of mechanism for storing or transmitting information in a device (for example, computer) readable form. For example, the readable medium includes RAM, ROM, disk storage medium, optical storage medium, flash memory device, and signals (for example, carrier, infrared signal and digital signal) transmitted in electric, optical, acoustic or other forms.

An ordinary person skilled in the art may understand that, each frame in these structure diagrams and/or block diagrams and/or flowcharts and combinations of frames in these structure diagrams and/or block diagrams and/or flowcharts may be implemented by computer program instructions. These computer program instructions may be provided to general-purpose computers, special-purpose computers or other processors of programmable data processing method to generate a machine, thus creating methods designated for implementing one or more frames in the schematic diagrams and/or the block diagrams and/or the flowcharts by instructions executed by the computers or other processors of programmable data processing method.

An ordinary person skilled in the art may understand that, the steps, measures and solutions in various operations, methods and flows which have been discussed in the invention may be alternated, changed, combined or deleted. Further, other steps, measures and solutions in various operations, methods and flows which have been discussed in the invention may also be alternated, changed, rearranged, decomposed, combined or deleted. Further, the steps, measures and solutions in various operations, methods and flows disclosed in the invention in the prior art may also be alternated, changed, rearranged, decomposed, combined or deleted.

The above is only a part of implementations of the invention. It should be pointed out that, for an ordinary person skilled in the art, the invention may have various improvements and embellishments without departing from the principle of the invention. These improvements and embellishments should also be regarded as falling into the protection scope of the invention.

The invention claimed is:

1. A method for uplink packet scheduling by a base station, the method comprising:

receiving, from a terminal, information on a type of the terminal, the information on the type of the terminal including at least one of application purposes of the terminal or service types of the terminal;

transmitting, to the terminal, a type group RNTI for the terminal based on the information on the type of the terminal;

transmitting, to the terminal, first downlink control information based on the type group RNTI, on a physical downlink control channel (PDCCH), a physical downlink shared channel (PDSCH), including a scheduling group RNTI or scheduling group index, is indicated by the first downlink control information;

in case that the PDSCH includes the scheduling group RNTI, transmitting, to the terminal, second downlink control information based on the scheduling group RNTI, on the PDCCH, the second downlink control information including uplink scheduling information; and receiving, from at least one terminal which belongs to a group determined based on the scheduling group, uplink data based on the uplink scheduling information, on a physical uplink shared channel (PUSCH), wherein when the PDSCH, indicated by the first downlink control information, includes the scheduling group index without indirectly indicating a scheduling group radio network temporary identifier (RNTI), the scheduling group RNTI is obtained based on the type group RNTI and the scheduling group index, and wherein when the PDSCH, indicated by the first downlink control information, includes the scheduling group index indirectly indicating the scheduling group RNTI, the scheduling group RNTI is obtained by a formula that the scheduling group RNTI=the type group RNTI±the scheduling group index, the scheduling group index being greater or equivalent to an integer of 1.

2. The method for uplink packet scheduling according to claim 1, wherein the information on the type of the terminal includes at least one of uplink services distribution of the terminals or data volume of a PUSCH transmission of the terminals.

3. The method for uplink packet scheduling according to claim 1, wherein the transmitting of the first downlink control information and the second downlink control information to the terminals is performed in any of the following modes: informing all terminals in the type group associated with the first downlink control information on the PDSCH corresponding to the first downlink control information, and transmitting a public uplink scheduling command to all terminals in the type group on the PDCCH corresponding to the second downlink control information; informing all machine type communication (MTC) terminals in the type group associated with the first downlink control information and a public uplink scheduling command on the PDSCH corresponding to the second downlink control information; or informing all MTC terminals in the type group associated with the first downlink control information and uplink scheduling commands of respective terminals in the type group on the PDSCH corresponding to the second downlink control information.

4. A method for uplink packet scheduling by a terminal, the method comprising:

transmitting, to the base station, information on a type of the terminal, the information on the type of the terminal including at least one of application purposes of the terminal or service types of the terminal;

receiving, from the base station, a type group RNTI for the terminal based on the information on the type of the terminal;

receiving, from the base station, a first downlink control information based on the type group, on a physical downlink control channel (PDCCH);

obtaining a scheduling group RNTI or scheduling group index on a physical downlink shared channel (PDSCH) indicated by the first downlink control information;

in case that the PDSCH includes the scheduling group RNTI, receiving from the base station, a second downlink control information based on the scheduling group RNTI, on the PDCCH, the second downlink control information including uplink scheduling information; and transmitting, to the base station, uplink data based on the uplink scheduling information, on a physical uplink shared channel (PUSCH), wherein when the PDSCH indicated by the first downlink control information includes the scheduling group index without indirectly indicating a scheduling group radio network temporary identifier (RNTI), the scheduling group RNTI is obtained based on the type group RNTI and the scheduling group index, and wherein when the PDSCH, indicated by the first downlink control information, includes the scheduling group index indirectly indicating the scheduling group RNTI, the scheduling group RNTI is obtained by a formula that the scheduling group RNTI=the type group RNTI±the scheduling group index, the scheduling group index being greater or equivalent to an integer of 1.

5. The method for uplink packet scheduling according to claim 4, wherein the information on the type of the terminal includes at least one of uplink services distribution of the terminal or data volume of a PUSCH transmission of the terminal.

6. The method for uplink packet scheduling according to claim 4, further comprising: receiving the second downlink control information based on the scheduling group RNTI to obtain the uplink scheduling information, the uplink scheduling information being an identical public uplink scheduling information for terminals in the scheduling group.

7. The method for uplink packet scheduling according to claim 4, further comprising: receiving feedback information of the PDSCH.

8. A base station, the base station comprising:

a grouping device;

a receiver configured to receive, from a terminal, information on a type of the terminal; and a transmitter configured to:

transmit, to the terminal, a type group RNTI for the terminal based on the information on the type of the terminal, the information on the type of the terminal including at least one of application purposes of the terminal or service types of the terminal, transmit, to the terminal, first downlink control information based on the type group, on a physical downlink control channel (PDCCH), a physical downlink shard channel (PDSCH), including a scheduling group RNTI or scheduling group index, is indicated by the first downlink control information, and in case that the PDSCH includes the information on the scheduling group RNTI, transmit, to the terminal, second downlink control information based on the scheduling group RNTI, on the PDCCH, the second downlink control information including uplink scheduling information, wherein the receiver is configured to receive, from at least one terminal which belongs to a group determined based on the scheduling group, uplink data based on the uplink scheduling information, on a physical uplink shared channel (PUSCH), and wherein when the PDSCH indicated by the first downlink control information includes the scheduling group index without indirectly indicating a scheduling group radio network temporary identifier (RNTI), the scheduling group RNTI is obtained based on the type group RNTI and the scheduling group index, and wherein when the PDSCH indicated by the first downlink control information includes the scheduling group index indirectly indicating the scheduling group RNTI, the scheduling group RNTI is obtained by a formula that the scheduling group RNTI=the type group RNTI±the scheduling group index, the scheduling group index being greater or equivalent to an integer of 1.

9. The base station according to claim 8, wherein the information on the type of terminal includes at least one of uplink services distribution of the terminals or data volume of a PUSCH transmission of the terminals.

10. A terminal, the terminal comprising:
a receiver; and
a transmitter configured to transmit, to the base station, information on a type of the terminal, wherein the receiver is configured to:
receive, from the base station, a type group RNTI for the terminal based on the information on the type of the terminal, the information on the type of the terminal including at least one of application purposes of the terminal or service types of the terminal,
receive, from the base station, a first downlink control information based on the type group RNTI, on a physical downlink control channel (PDCCH),
obtain a scheduling group RNTI or scheduling group index on a physical downlink shared channel (PDSCH) indicated by the first downlink control information, and
in case that the PDSCH includes the scheduling group RNTI, receive from the base station, a second downlink control information based on the scheduling group RNTI, on the PDCCH, the second downlink control information including uplink scheduling information, and wherein the transmitter in configured to transmit, to the base station, uplink data based on the uplink scheduling information, on a physical uplink shared channel (PUSCH), and wherein when the PDSCH indicated by the first downlink control information includes the scheduling group index without indirectly indicating a scheduling group radio network temporary identifier (RNTI), the scheduling group RNTI is obtained based on the type group RNTI and the scheduling group index, and wherein when the PDSCH indicated by the first downlink control information includes the scheduling group index indirectly indicating the scheduling group RNTI, the scheduling group RNTI is obtained by a formula that the scheduling group RNTI=the type group RNTI±the scheduling group index, the scheduling group index being greater or equivalent to an integer of 1.

11. The terminal according to claim 10, wherein the information on the type of the terminal includes at least one of uplink services distribution of the terminal or data volume of a PUSCH transmission of the terminal.

* * * * *